(12) United States Patent
Ohnishi et al.

(10) Patent No.: US 9,928,489 B2
(45) Date of Patent: Mar. 27, 2018

(54) ASSISTING IN BILL SPLIT PAYMENT

(71) Applicant: International Business Machines Corporation, Armonk, NY (US)

(72) Inventors: Yoriko Ohnishi, Yokohama (JP); Masami Tada, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 926 days.

(21) Appl. No.: 14/089,533

(22) Filed: Nov. 25, 2013

(65) Prior Publication Data
US 2014/0180929 A1 Jun. 26, 2014

(30) Foreign Application Priority Data
Dec. 5, 2012 (JP) ................... 2012-266103

(51) Int. Cl.
*G06Q 20/10* (2012.01)
*G06Q 20/38* (2012.01)

(52) U.S. Cl.
CPC ..... *G06Q 20/102* (2013.01); *G06Q 20/38215* (2013.01)

(58) Field of Classification Search
USPC .......................................................... 705/64
See application file for complete search history.

(56) References Cited

U.S. PATENT DOCUMENTS

| 2004/0199475 | A1* | 10/2004 | Rivest | G06Q 20/02 705/67 |
| 2004/0248548 | A1* | 12/2004 | Niwa | G06Q 20/00 455/407 |
| 2008/0052091 | A1* | 2/2008 | Vawter | G06Q 20/10 705/39 |
| 2009/0037286 | A1 | 2/2009 | Foster | |
| 2012/0166332 | A1* | 6/2012 | Naaman | G06Q 20/102 705/40 |
| 2012/0209749 | A1* | 8/2012 | Hammad | G06Q 30/06 705/27.1 |

(Continued)

FOREIGN PATENT DOCUMENTS

| JP | 2002133127 A | 5/2002 |
| JP | 2003099685 A | 4/2003 |

(Continued)

*Primary Examiner* — Kito R Robinson
*Assistant Examiner* — Shacole Tibljas
(74) *Attorney, Agent, or Firm* — Michael D. Purdham

(57) ABSTRACT

When a split amount decided by a representative splitting, in a representative terminal, a total amount transmitted from a store terminal is notified from each member terminal to a credit company server as a payment amount, the credit company server holds information for payment settlement, and transmits payment permission information including encrypted information generated by encrypting the information for payment settlement, to each member terminal. Each member terminal transmits payment permission information of the same contents as the payment permission information to the representative terminal. The representative terminal transmits payment permission information obtained by concatenating the payment permission information, to the store terminal.

20 Claims, 24 Drawing Sheets

(56) References Cited

U.S. PATENT DOCUMENTS

| | | | |
|---|---|---|---|
| 2013/0006853 A1* | 1/2013 | Amundsen | G06Q 40/00 |
| | | | 705/40 |
| 2013/0041824 A1* | 2/2013 | Gupta | G06Q 40/00 |
| | | | 705/44 |
| 2013/0080239 A1* | 3/2013 | Okerlund | G06Q 30/0226 |
| | | | 705/14.33 |
| 2014/0156508 A1 | 6/2014 | Argue et al. | |
| 2014/0214652 A1 | 7/2014 | Zheng et al. | |
| 2014/0222663 A1* | 8/2014 | Park | G06Q 20/29 |
| | | | 705/39 |
| 2014/0279098 A1* | 9/2014 | Ham | G06Q 20/102 |
| | | | 705/16 |
| 2014/0351130 A1* | 11/2014 | Cheek | G06Q 20/29 |
| | | | 705/44 |

FOREIGN PATENT DOCUMENTS

| | | |
|---|---|---|
| JP | 2004246855 A | 9/2004 |
| JP | 2004280318 A | 10/2004 |
| JP | 2005107778 A | 4/2005 |
| JP | 2005267012 A | 9/2005 |
| JP | 2008107874 A | 5/2008 |
| WO | WO03038698 A1 | 5/2003 |
| WO | 2013048566 A1 | 4/2013 |

\* cited by examiner

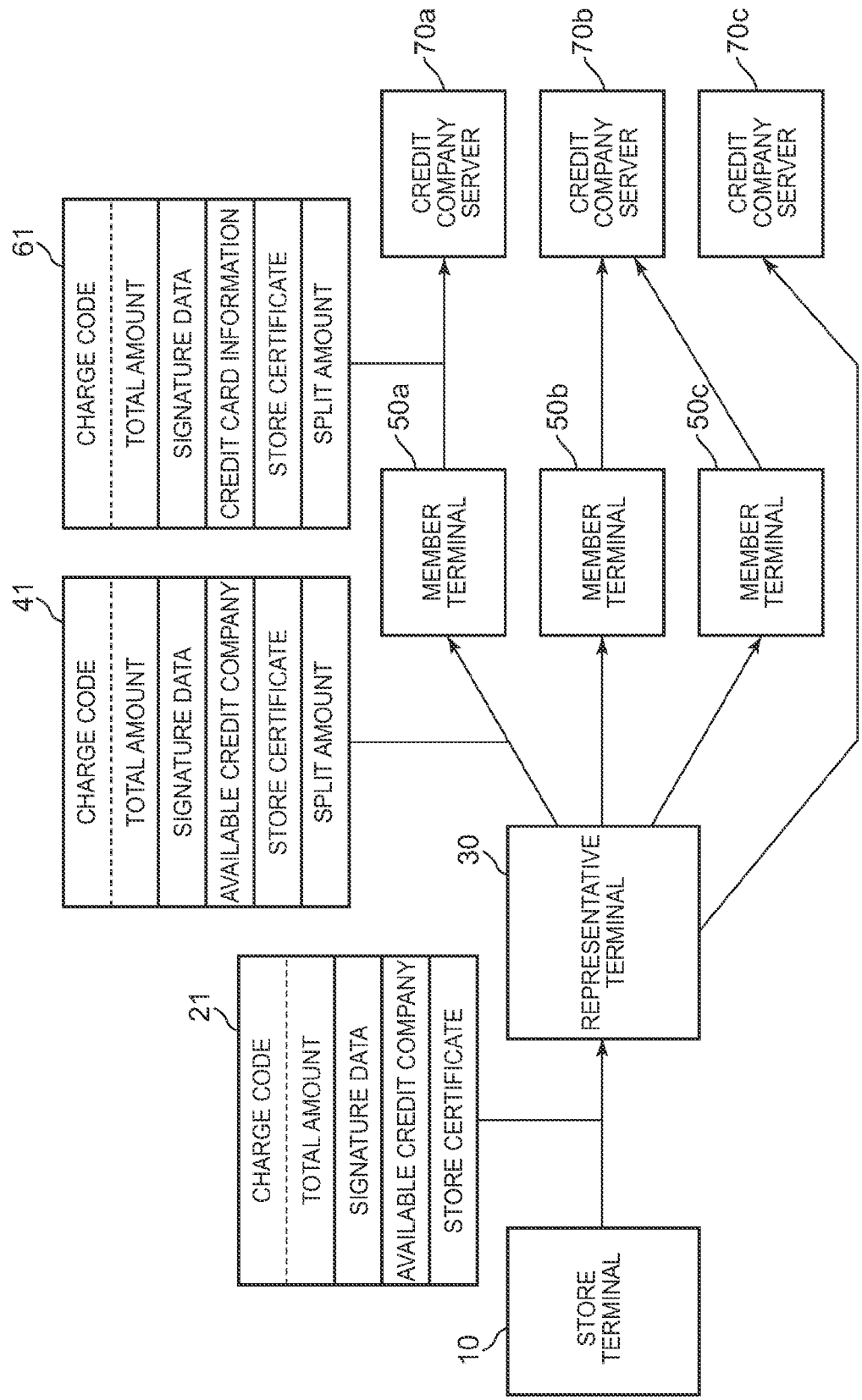

```xml
<?xml version="1.0" encoding="UTF-8"?>
<Bill>
   <ProtectedData>
      <ID>201204011230123</ID>
      <AllPrice>6,000</AllPrice>
   </ProtectedData>
   <Signature>D3ABB3D83E52495E8C90C1E7AA805E54</Signature>
   <Breakout>
      <Item>
         <ItemName>SET MEAL A<ItemName>
         <ItemPrice>1,000 yen<ItemPrice>
      </Item>
      <Item>
         <ItemName>SET MEAL A<ItemName>
         <ItemPrice>1,000 yen<ItemPrice>
      </Item>
      <Item>
         <ItemName>SET MEAL B<ItemName>
         <ItemPrice>1,200 yen<ItemPrice>
      </Item>
      <Item>
         <ItemName>SET MEAL C<ItemName>
         <ItemPrice>1,200 yen<ItemPrice>
      </Item>
      <Item>
         <ItemName>BEER<ItemName>
         <ItemPrice>600 yen<ItemPrice>
      </Item>
   </Breakout>
   <ValidCredit>
      <Name>Visa</Name>
      <Name>Master</Name>
      <Name>JCB</Name>
   </ValidCredit>
   <Certification>
      30820af602010330820ab206092a8648···
   </Certification>
</Bill>
```

- 211: `<ID>201204011230123</ID>`
- 212: `<AllPrice>6,000</AllPrice>`
- 213: `<Signature>...</Signature>`
- 214: `<Breakout>...</Breakout>`
- 215: `<ValidCredit>...</ValidCredit>`
- 216: `<Certification>...</Certification>`

FIG. 3

```
<?xml version="1.0" encoding="UTF-8"?>
<Bill>
    <ProtectedData>
        <ID>201204011230123</ID>
        <AllPrice>6,000</AllPrice>
    </ProtectedData>
    <Signature>D3ABB3D83E52495E8C90C1E7AA805E54</Signature>
    <Price>1,500</Price>
    <ValidCredit>
        <Name>Visa</Name>
        <Name>Master</Name>
        <Name>JCB</Name>
    </ValidCredit>
    <Certification>
        30820af602010330820ab206092a8648···
    </Certification>
</Bill>
```

411 — <ID>201204011230123</ID>
412 — <AllPrice>6,000</AllPrice>
413 — <Signature>D3ABB3D83E52495E8C90C1E7AA805E54</Signature>
414 — <Price>1,500</Price>
415 — <ValidCredit> ... </ValidCredit>
416 — <Certification> ... </Certification>

FIG. 4

```
<?xml version="1.0" encoding="UTF-8"?>
<Bill>
   <ProtectedData>
      <ID>201204011230123</ID>
      <AllPrice>6,000</AllPrice>
   </ProtectedData>
   <Signature>D3ABB3D83E52495E8C90C1E7AA805E54</Signature>
   <Certification>
       30820af602010330820ab206092a8648···
   </Certification>
   <Price>1,500</Price>
   <Name>TARO TANAKA</Name>
   <CardID>11222333</CardID)
   <GoodThru>01/14</GoodThru>
</Bill>
```

Labels: 611 → `<ID>201204011230123</ID>`; 612 → `<AllPrice>6,000</AllPrice>`; 613 → `<Signature>...</Signature>`; 614 → `<Certification>...</Certification>`; 615 → `<Price>1,500</Price>`; 616 → `<Name>`, `<CardID>`, `<GoodThru>` lines.

FIG. 5

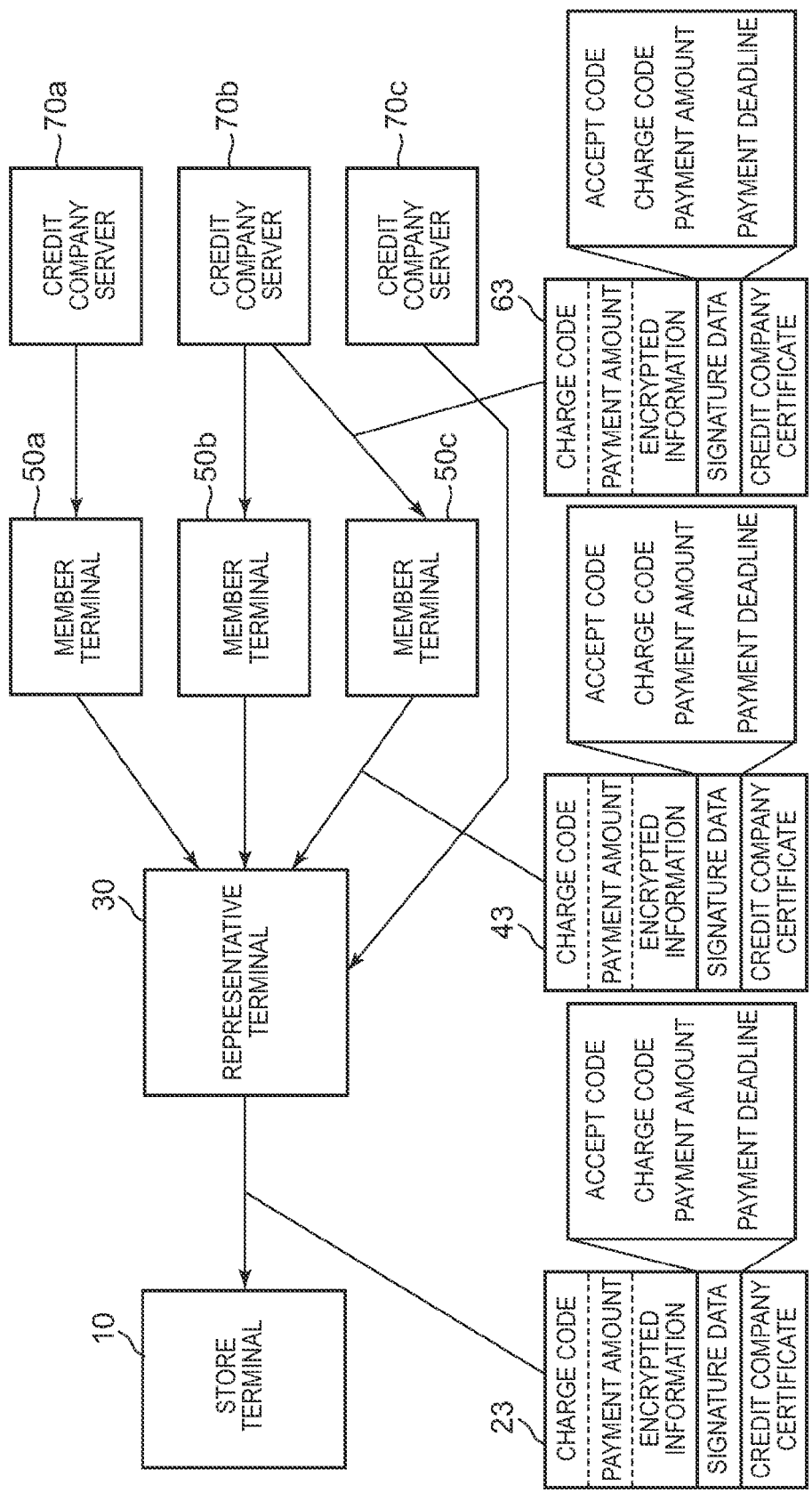

| ACCEPT CODE | CHARGE CODE | STORE ID | CARD ID | PAYMENT AMOUNT | PAYMENT DEADLINE |
|---|---|---|---|---|---|
| 00001001 | 201204011230123 | shop0011 | 111222333 | 1,500 | 2012/04/30 |
| | | | | | |

FIG. 7

```
<?xml version="1.0" encoding="UTF-8"?>
<Payment>
    <ProtectedData>
        <ID>201204011230123</ID>
        <Price>1,500</Price>
        <EncryptedData>
            723705C1E7054fA7BF67E342F0ED043E···
        </EncryptedData>
    </ProtectedData>
    <Signature>BC0FF92C9463408B8EC2-349347C20C18</Signature>
    <Certification>
        30820af602010330820cc9906093c8648···
    </Certification>
</Payment>
```

631 — <ID>
632 — <Price>
633 — <EncryptedData>
634 — <Signature>
635 — <Certification>

FIG. 8

```xml
<?xml version="1.0" encoding="UTF-8"?>
<Payments>
   <AllPrice>6,000</AllPrice>
   <Payment>
      <ProtectedData>
         <ID>201204011230123</ID>
         <Price>1,500</Price>
         <EncryptedData>
            723705C1E7054fA7BF67E342F0ED043E...
         </EncryptedData>
      </ProtectedData>
      <Signature>BC0FF92C9463408B8EC2-349347C20C18</Signature>
      <Certification>
         30820af602010330820cc9906093c8648...
      </Certification>
   </Payment>
   <Payment>
      ......
   </Payment>
   ......
</Payments>
```

FIG. 9

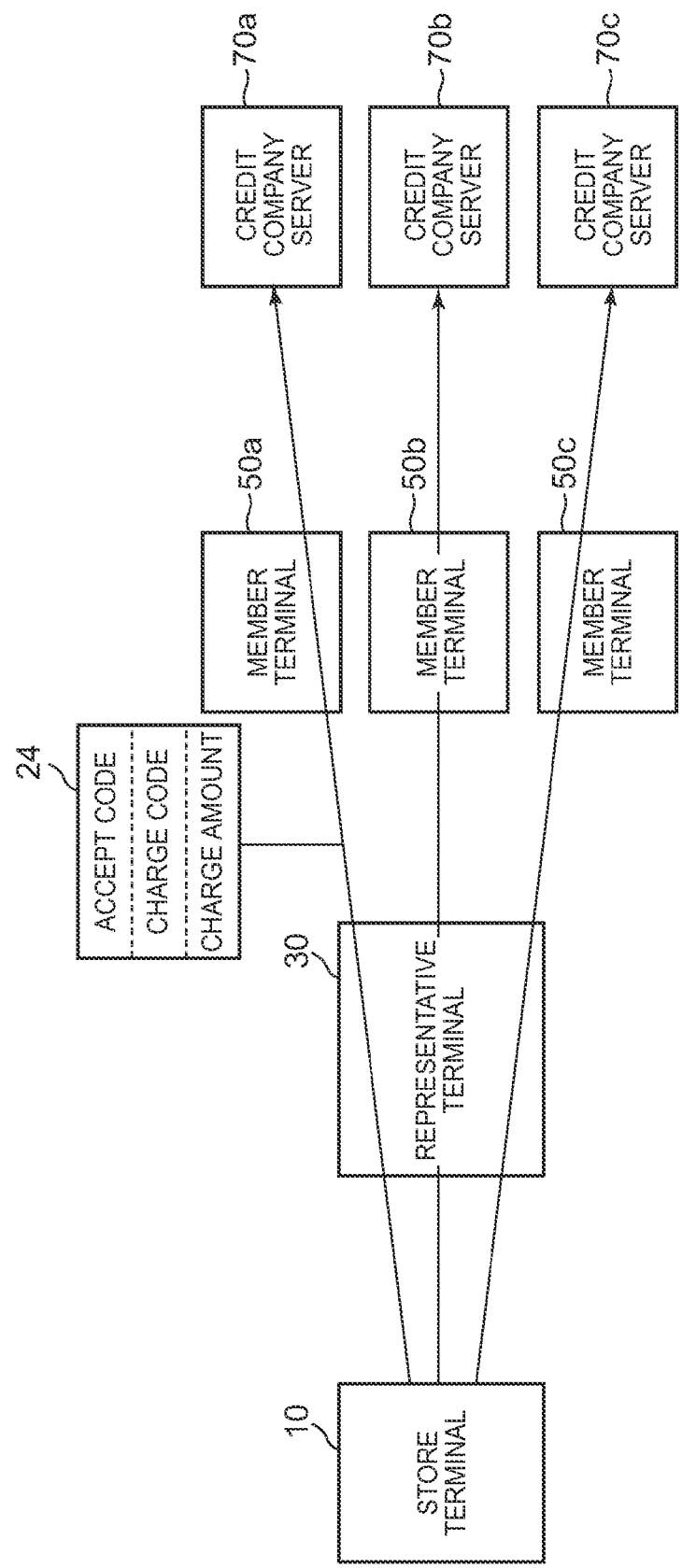

FIG. 11

```
BILL SPLIT APPLICATION (REPRESENTATIVE)

ID:201204011230123  ——341
   TOTAL CHARGE AMOUNT: 6,000yen  ——342
   SIGNATURE: OK  ——343

BILL SPLIT METHOD: | EVEN SPLIT ▽ | ——344
   NUMBER OF PEOPLE: 4
                              345
   MEMBER:
   ┌─────────────────────────────────┐   ┌──────┐
   │ REPRESENTATIVE  1,500yen  OK    │   │ ADD  │——346
   │ MEMBER a        1,500yen  OK    │   └──────┘
   │ MEMBER b        1,500yen  Waiting│  ┌──────┐
   │ MEMBER c        1,500yen  Waiting│  │ EDIT │——347
   └─────────────────────────────────┘   └──────┘
                                         ┌──────┐
                                         │CHARGE│——348
                                         └──────┘
   ┌──────┐
   │ PAY  │——349
   └──────┘
```

FIG. 13

```
BILL SPLIT APPLICATION (MEMBER)

ID:201204011230123 ——541
SPLIT AMOUNT: 1,500yen (TOTAL CHARGE AMOUNT: 6,000yen)——542
SIGNATURE: OK ——543
                        544
CREDIT CARD :   [CREDIT A  ▽]     [ADD]——549
PAYMENT METHOD: [LUMP SUM  ▽]——545
CARD NUMBER :   [000011112222]——546
     548
[PAY]  [AUTHENTICATE]——547
```

| ACCEPT CODE | CHARGE CODE | STORE ID | CARD ID | PAYMENT AMOUNT | PAYMENT DEADLINE |
|---|---|---|---|---|---|
| 00001001 | 201204011 230123 | shop0011 | 111222333 | 5,000 | 2012/04/30 |
| | | | | | |

ASSISTING IN BILL SPLIT PAYMENT

BACKGROUND

The present invention relates to a mechanism for assisting in bill split payment.

Recent years have seen widespread use of cards or electronic money to pay for various goods and services. For example, in the case where people eat together, they may want to pay for the meal by splitting the bill (bill split payment). However, it is not easy to make bill split payment by cards or electronic money.

Various bill split payment methods are conventionally proposed.

A first method discloses the following technique. In the case of splitting (individual split or simple split) payment of a total amount for items traded in one transaction with a group of a plurality of customers in an ECR for processing customer transaction-related data in settlement of various bills, when each payer designates a payment method (cash, credit card, debit card, prepaid card, etc.), the payment of the split amount for each payer is settled according to the designated payment method of the payer.

A second method discloses the following technique. A provider is paid by a card of a representative. After this, information for executing bill split payment is presented to each bill split payer from a server of a settlement agency including a credit card company via a network.

A third method and fourth method disclose the following techniques. When a sale is made through the use of a credit card, sale information including use amount information that indicates the use amount corresponding to the use is stored. In the case where a credit card system accepts a request for bill split payment for already made sales, the credit card system searches stored sale information for sale information relating to the accepted request, splits the use amount indicated by the use amount information included in the searched-for sale information, and, based on the split result, updates the searched-for sale information which is split-source sale information and also stores split-result sale information.

A fifth method discloses the following technique. In the case of making bill split payment, a payment amount per person is calculated and transmitted to each member terminal device, and settlement data corresponding to the payment amount is acquired from each member terminal device.

A sixth method discloses the following technique. A calculation unit of a mobile terminal of a representative who paid a total bill to a store as a representative of a group calculates a payment amount to be paid by each person of the group, and transmits accounting data including the calculated payment amount of each person to a mobile terminal of the person. As a result, the mobile terminal of each person transmits electronic money data corresponding to the payment amount of the person to the mobile terminal of the representative, and the mobile terminal of the representative receives the electronic money data. The bill split payment by each person of the group is settled in this way.

Thus, methods of making bill split payment by cards or electronic money are conventionally available.

However, in the first method, the designation of the payment method and the settlement of the split bill according to the payment method are performed for each payer in the ECR, which requires a complex procedure in front of the ECR in a restaurant or the like.

In the second and fourth methods, in bill split payment, the representative (split requester) and the bill split payer (split approver) each pay by a credit card. Accordingly, no complex procedure is required in front of the ECR in a restaurant or the like. However, after the representative (split requester) requests the bill split payer (split approver) to pay the split amount, the bill split payer (split approver) makes the payment to the credit card company. This obscures who is responsible for the payment.

In the fifth and sixth methods, in bill split payment, the representative terminal receives information for payment settlement from each member terminal and transmits the information to a POS terminal. This clarifies who is responsible for the payment, but there is a risk of the contents of the information for payment settlement being known to the representative.

SUMMARY

An object of the present invention is to reduce the possibility that, in the case where the representative receives information for payment settlement from each payer and transmits the information to the payee in bill split payment in order to clarify who is responsible for the payment, the contents of the information for payment settlement are known to the representative.

For the stated object, the present invention provides a system for assisting in bill split payment, the system including: a payee computer used by a payee; a representative computer used by a representative of a group including a plurality of payers, the representative computer transmitting first amount information indicating a first amount decided by the representative for each of the plurality of payers; a plurality of payer computers used respectively by the plurality of payers, each of the plurality of payer computers receiving the first amount information transmitted from the representative computer for the payer who uses the payer computer, and transmitting second amount information indicating a second amount according to the first amount indicated by the first amount information; and a settlement computer for settling payment, the settlement computer receiving the second amount information transmitted from each of the plurality of payer computers, holding settlement information for settling payment according to the second amount indicated by the second amount information, and transmitting encrypted information and the second amount information to the payer computer, the encrypted information being generated by encrypting the settlement information using a public key of the payee, wherein each of the plurality of payer computers transmits the encrypted information and the second amount information transmitted from the settlement computer, to the representative computer, wherein the representative computer transmits, for each of the plurality of payer computers, the encrypted information transmitted from the payer computer and third amount information to the payee computer on a condition that the representative computer has received the encrypted information and the second amount information from all of the plurality of payer computers, the third amount information indicating a third amount that is calculated by splitting a payment amount to the payee and is according to the second amount transmitted from the payer computer, and wherein the payee computer acquires, for each of the plurality of payer computers, the settlement information by decrypting the encrypted information transmitted from the payer computer using a secret key of the payee, and transmits the settlement information and the third amount information transmitted from the payer computers, through the representative computer, to the settlement computer.

Here, the payee computer may transmit a total amount of a charge to the representative computer, before the representative computer transmits the first amount information, wherein the representative computer decides a split amount calculated by the representative splitting the total amount transmitted from the payee computer, as the first amount, wherein each of the plurality of payer computers sets the split amount as the second amount, and wherein the representative computer sets the split amount as the third amount.

Alternatively, the representative computer may decide an advance collected amount as the first amount, wherein each of the plurality of payer computers sets a payment upper limit amount decided by the payer who uses the payer computer according to the advance collected amount, as the second amount, wherein the payee computer transmits a total amount of a charge to the representative computer, after the representative computer receives the encrypted information and the second amount information from all of the plurality of payer computers, and wherein the representative computer decides a split amount calculated by the representative splitting the total amount transmitted from the payee computer so as not to exceed the payment upper limit amount, as the third amount.

The present invention also provides a method for assisting in bill split payment by: a representative computer used by a representative of a group including a plurality of payers; a plurality of payer computers used respectively by the plurality of payers; a payee computer used by a payee; and a settlement computer for settling payment, the method including: a step of the representative computer transmitting first amount information indicating a first amount decided by the representative for each of the plurality of payers, to the payer computer of the plurality of payer computers that is used by the payer; a step of each of the plurality of payer computers transmitting second amount information indicating a second amount according to the first amount indicated by the first amount information transmitted from the representative computer, to the settlement computer; a step of the settlement computer holding settlement information for settling payment according to the second amount indicated by the second amount information transmitted from each of the plurality of payer computers, and transmitting encrypted information and the second amount information to the payer computer, the encrypted information being generated by encrypting the settlement information using a public key of the payee; a step of each of the plurality of payer computers transmitting the encrypted information and the second amount information transmitted from the settlement computer, to the representative computer; a step of the representative computer transmitting, for each of the plurality of payer computers, the encrypted information transmitted from the payer computer and third amount information to the payee computer on a condition that the representative computer has received the encrypted information and the second amount information from all of the plurality of payer computers, the third amount information indicating a third amount that is calculated by splitting a payment amount to the payee and is according to the second amount indicated by the second amount information transmitted from the payer computer; and a step of the payee computer acquiring, for each of the plurality of payer computers, the settlement information by decrypting the encrypted information transmitted from the payer computer using a secret key of the payee, and transmitting the settlement information and the third amount information transmitted from the payer computers, through the representative computer, to the settlement computer.

The present invention also provides a device for assisting in bill split payment, the device being used by a representative of a group including a plurality of payers and being connected to a plurality of payer computers used respectively by the plurality of payers and a payee computer used by a payee, the device including: a decision unit for deciding a first amount for each of the plurality of payers according to an operation of the representative; a transmission unit for transmitting first amount information indicating the first amount decided by the decision unit for each of the plurality of payers, to the payer computer of the plurality of payer computers that is used by the payer; and a reception unit for receiving encrypted information and second amount information from each of the plurality of payer computers, the encrypted information being generated by encrypting, using a public key of the payee, settlement information for settling payment of a second amount according to the first amount indicated by the first amount information transmitted from the transmission unit for the payer who uses the payer computer, and the second amount information indicating the second amount, wherein the transmission unit transmits, for each of the plurality of payer computers, the encrypted information transmitted from the payer computer and third amount information to the payee computer on a condition that the reception unit has received the encrypted information and the second amount information from all of the plurality of payer computers, the third amount information indicating a third amount that is calculated by splitting a payment amount to the payee and is according to the second amount transmitted from the payer computer.

The present invention further provides a program product for causing a computer to function as a device for assisting in bill split payment, the device being used by a representative of a group including a plurality of payers and being connected to a plurality of payer computers used respectively by the plurality of payers and a payee computer used by a payee, the program product causing the computer to function as: a decision unit for deciding a first amount for each of the plurality of payers according to an operation of the representative; a transmission unit for transmitting first amount information indicating the first amount decided by the decision unit for each of the plurality of payers, to the payer computer of the plurality of payer computers that is used by the payer; and a reception unit for receiving encrypted information and second amount information from each of the plurality of payer computers, the encrypted information being generated by encrypting, using a public key of the payee, settlement information for settling payment of a second amount according to the first amount indicated by the first amount information transmitted from the transmission unit for the payer who uses the payer computer, and the second amount information indicating the second amount, wherein the transmission unit transmits, for each of the plurality of payer computers, the encrypted information transmitted from the payer computer and third amount information to the payee computer on a condition that the reception unit has received the encrypted information and the second amount information from all of the plurality of payer computers, the third amount information indicating a third amount that is calculated by splitting a payment amount to the payee and is according to the second amount transmitted from the payer computer.

According to the present invention, the possibility that, in the case where the representative receives information for payment settlement from each payer and transmits the information to the payee in bill split payment in order to clarify who is responsible for the payment, the contents of the information for payment settlement are known to the representative can be reduced.

BRIEF DESCRIPTION OF THE SEVERAL VIEWS OF THE DRAWINGS

FIG. 2 is a diagram showing an operation outline when each of a representative and members requests a credit company to make payment in accordance with an illustrative embodiment;

FIG. 3 is a diagram showing a specific example of total amount charge information transmitted from a store terminal in accordance with an illustrative embodiment;

FIG. 4 is a diagram showing a specific example of split amount charge information transmitted from a representative terminal in accordance with an illustrative embodiment;

FIG. 5 is a diagram showing a specific example of payment request information transmitted from a member terminal in accordance with an illustrative embodiment;

FIG. 6 is a diagram showing an operation outline when the credit company permits payment in accordance with an illustrative embodiment;

FIG. 7 is a diagram showing an example of a database in a credit company server in accordance with an illustrative embodiment;

FIG. 8 is a diagram showing a specific example of payment permission information transmitted from the credit company server in accordance with an illustrative embodiment;

FIG. 9 is a diagram showing a specific example of payment permission information transmitted from the representative terminal in accordance with an illustrative embodiment;

FIG. 10 is a diagram showing an operation outline when a store requests the credit company to make settlement in accordance with an illustrative embodiment;

FIG. 11 is a diagram showing a first example of a screen displayed on the representative terminal in accordance with an illustrative embodiment;

FIG. 13 is a diagram showing a first example of a screen displayed on the member terminal in accordance with an illustrative embodiment;

FIG. 19 is a diagram showing an example of a database in the credit company server in accordance with an illustrative embodiment;

DETAILED DESCRIPTION

The following describes embodiments of the present invention in detail, with reference to attached drawings.

Figure 1:
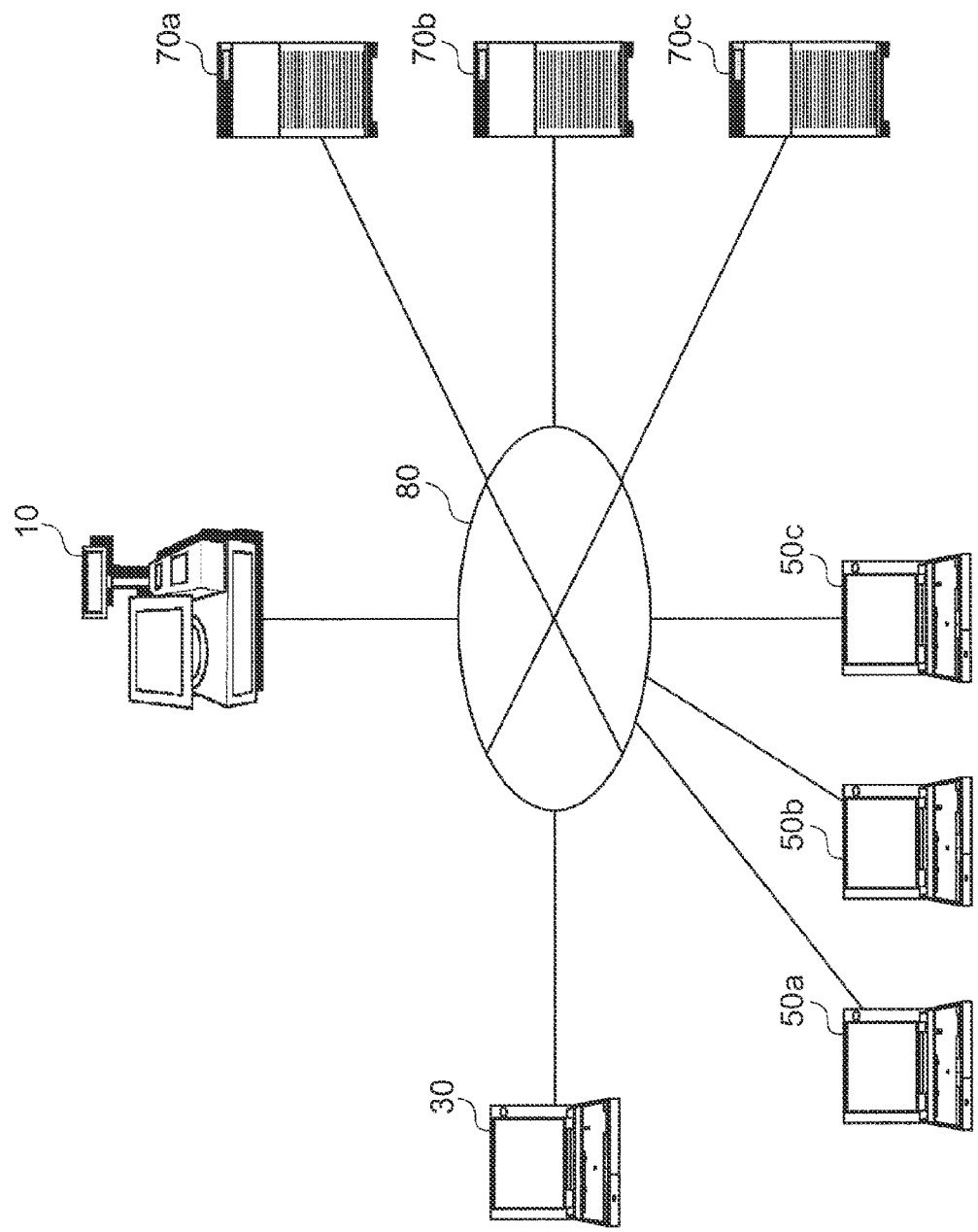
FIG. 1 is a diagram showing an example of an overall structure of a computer system to which embodiments of the present invention are applied.

FIG. 1 is a diagram showing an example of an overall structure of a computer system to which the embodiments are applied.

As shown in the drawing, the computer system is formed by connecting a store terminal 10, a representative terminal 30, member terminals 50a, 50b, and 50c, and credit company servers 70a, 70b, and 70c by a network 80.

Though the member terminals 50a, 50b, and 50c are shown in the drawing, the member terminals 50a, 50b, and 50c are each referred to as a member terminal 50 in the case where there is no need to distinguish them. Moreover, though only three member terminals 50 are shown in the drawing, four or more member terminals 50 may be provided. Though the credit company servers 70a, 70b, and 70c are shown in the drawing, the credit company servers 70a, 70b, and 70c are each referred to as a credit company server 70 in the case where there is no need to distinguish them. Moreover, though only three credit company servers 70 are shown in the drawing, four or more credit company servers 70 may be provided.

The store terminal 10 is a terminal device such as a POS (Point Of Sales) terminal used by a store. In more detail, the store terminal 10 charges the representative terminal 30 to pay a total amount and, upon receiving permission for the payment of the total amount from the representative terminal 30, requests the credit company server 70 to settle the payment. In this embodiment, the store is used as an example of a payee, and the store terminal 10 is provided as an example of a payee computer.

The representative terminal 30 is a terminal device such as a PC used by a representative of a group paying to the store. In more detail, the representative terminal 30 splits the total amount notified from the store terminal 10 to decide a split amount and, having confirmed that each member terminal 50 permits to pay the split amount, transmits the permission for the payment of the total amount to the store terminal 10. The representative terminal 30 may also request the credit company server 70 to make payment. In this embodiment, the representative terminal 30 is provided as an example of a representative computer.

The member terminal 50 is a terminal device such as a PC used by a member, other than the representative, of the group paying to the store. In more detail, the member terminal 50 requests the credit company server 70 to make payment according to the information transmitted from the representative terminal 30 and, upon completion of reservation of the payment, transmits the permission for the payment to the representative terminal 30. In this embodiment, the member is used as an example of a payer, and the member terminal 50 is provided as an example of a payer computer.

The credit company server 70 is a server computer used by a credit card company (hereafter referred to as a "credit company"). In more detail, the credit company server 70 reserves the payment according to the payment request from the representative terminal 30 and the member terminal 50, and settles the payment according to the request from the store terminal 10. In this embodiment, the credit company is used as an example of a settler, and the credit company server 70 is provided as an example of a settlement computer.

The network 80 is communication means used for information exchange between the store terminal 10 and the representative terminal 30, between the representative terminal 30 and the member terminal 50, between the representative terminal 30 and the credit company server 70, between the member terminal 50 and the credit company server 70, and between the store terminal 10 and the credit company server 70. The Internet is an example of the network 80.

An operation outline when each of the representative and the members requests the credit company to make payment is described first.

FIG. 2 is a schematic diagram showing the operation outline in accordance with an illustrative embodiment.

As shown in the drawing, first the store terminal 10 transmits total amount charge information 21 for charging the total amount to the representative terminal 30. Here, the total amount charge information 21 includes not only the total amount but also a charge code which is an example of a charge identifier for uniquely identifying the charge. The charge code is a UUID (Universally Unique Identifier), and is generated, for example, using the date and time of the charge and a serial number. It is desirable that signature data is added to the charge code and the total amount. For example, the result of encrypting a digest value of the charge code and the total amount using a secret key of the store may be used as the signature data. The total amount charge information 21 also includes an available credit company which is a list of credit companies available for payment. The total amount charge information 21 further includes a store certificate. For example, the store certificate may be an electronic certificate specified in ITU-T X.509, and may include a store ID, a public key of the store, and the like.

Next, in the representative terminal 30, the representative decides the split amount (an example of a first amount) for each member, by referencing to the total amount charged in the total amount charge information 21. The representative terminal 30 accordingly transmits split amount charge information 41 (an example of first amount information) for charging the split amount, to the member terminal 50 of each member. Here, the split amount charge information 41 includes the split amount, in addition to the charge code, the total amount, the signature data, the available credit company, and the store certificate in the total amount charge information 21.

Next, in the member terminal 50, each member decides a credit company to be used, by referencing to the available credit company included in the split amount charge information 41. The member then logs in to the credit company server 70 of the credit company, and transmits payment request information 61 (an example of second amount information) for requesting payment of the charged split amount (an example of a second amount) to the credit company server 70. Here, the payment request information 61 includes the charge code, the total amount, the signature data, the store certificate, and the split amount in the split amount charge information 41. Since the credit company to be used has been decided, the payment request information 61 does not include the available credit company, but includes credit card information such as a name, a card ID, an expiration date, and the like registered in the credit company to be used.

Following this, the credit company server 70 checks whether or not the payment is possible, based on the store certificate. For example, the credit company server 70 checks whether or not the value obtained by decrypting the signature data using the public key of the store included in the store certificate matches the digest value of the charge code and the total amount. If they match, the credit company server 70 determines that the payment is possible, on the ground that the charge code and the total amount have not been tampered with. Having determined that the payment is possible, the credit company server 70 reserves the payment.

In the case where the representative makes payment, too, the representative decides the split amount for the representative in the representative terminal 30. The representative then decides a credit company to be used by referencing to the available credit company included in the total amount charge information 21, logs in to the credit company server 70 of the credit company, and transmits payment request information 42 (not shown) for requesting payment of the split amount for the representative to the credit company server 70. Here, the payment request information 42 is information of the same contents as the payment request information 61.

FIG. 3 is a diagram showing a specific example of the total amount charge information 21 shown in FIG. 2. Though the total amount charge information 21 is in XML (eXtensible Markup Language) format in this example, the total amount charge information 21 may be in a format other than XML.

In the drawing, description 211 corresponds to the charge code, and description 212 corresponds to the total amount. Description 213 indicates signature data for information enclosed by a ProtectedData tag, and so corresponds to the signature data for the charge code and the total amount. Though not shown in FIG. 2, the total amount charge information 21 may include detail information indicating the details of the charge such as description 214. Description 215 corresponds to the available credit company, and description 216 corresponds to the store certificate.

FIG. 4 is a diagram showing a specific example of the split amount charge information 41 shown in FIG. 2. Though the split amount charge information 41 is in XML format in this example, the split amount charge information 41 may be in a format other than XML.

In the drawing, description 411 corresponds to the charge code, description 412 corresponds to the total amount, description 413 corresponds to the signature data, description 414 corresponds to the split amount, description 415 corresponds to the available credit company, and description 416 corresponds to the store certificate.

FIG. 5 is a diagram showing a specific example of the payment request information 61 shown in FIG. 2. Though the payment request information 61 is in XML format in this example, the payment request information 61 may be in a format other than XML.

In the drawing, description 611 corresponds to the charge code, description 612 corresponds to the total amount, description 613 corresponds to the signature data, description 614 corresponds to the store certificate, description 615 corresponds to the split amount, and description 616 corresponds to the credit card information.

An operation outline when the credit company permits payment is described next.

FIG. 6 is a schematic diagram showing the operation outline, and FIG. 7 is a diagram showing an example of a database 74 in the credit company server 70.

As shown in FIG. 6, first the credit company server 70 generates encrypted information by encrypting an accept code which is an example of an accept identifier for identifying the acceptance of the payment request, the charge code received from the store, and the split amount (payment amount) using the public key of the store, in the case of reserving the payment, i.e. in the case of permitting the payment. The accept code is a one-time code generated upon each payment permission. The public key of the store used here is the public key included in the store certificate. The information to be encrypted may include a deadline to pay (hereafter referred to as a "payment deadline"). The credit company server 70 accordingly transmits payment permission information 63 (an example of the second amount information) that includes not only the encrypted information but also the charge code and the payment amount accompanied by signature data of the credit company so that the representative can recognize the payment amount (an example of the second amount), to each member terminal 50.

In the case where the representative makes payment, too, the credit company server 70 also transmits payment permission information 43 of the same contents as the payment permission information 63 to the representative terminal 30.

Moreover, the accept code, the charge code, the store ID, the card ID, the payment amount, and the payment deadline are registered in the database 74, as shown in FIG. 7.

Next, the member terminal 50 of each member transmits payment permission information 43 (an example of the second amount information) to the representative terminal 30. The payment permission information 43 is the same as the payment permission information 63 received from the credit company server 70.

The representative terminal 30 waits for receiving the payment permission information 43 from the member terminals 50 of all members. Having received the payment permission information 43 from the member terminals 50 of all members, the representative sums the payment amounts of these members, and checks whether or not the sum matches the amount charged by the store. If they match, the representative terminal 30 transmits payment permission information 23 (an example of third amount information) including the payment amount (an example of a third amount) for each member, to the store terminal 10. This payment permission information 23 is generated by concatenating the payment permission information 43 received from the member terminals 50 of the members.

In the case where the representative makes payment, too, the representative terminal 30 also waits for receiving the payment permission information 43 from the credit company server 70 and, having received the payment permission information 43 from the credit company server 70, concatenates this payment permission information 43 with the other payment permission information 43.

FIG. 8 is a diagram showing a specific example of the payment permission information 63 (the same applies to the payment permission information 43) shown in FIG. 6. Though the payment permission information 63 is in XML format in this example, the payment permission information 63 may be in a format other than XML.

In the drawing, description 631 corresponds to the charge code, description 632 corresponds to the payment amount, and description 633 corresponds to the encrypted information. Description 634 indicates signature data for information enclosed by a ProtectedData tag, and so corresponds to the signature data for the charge code, the payment amount, and the encrypted information. Description 635 corresponds to the credit company certificate.

FIG. 9 is a diagram showing a specific example of the payment permission information 23 shown in FIG. 6. Though the payment permission information 23 is in XML format in this example, the payment permission information 23 may be in a format other than XML.

In the drawing, information enclosed by a Payment tag indicates information per person, and is the same as the payment permission information 43 received from the member terminal 50.

An operation outline when the store requests the credit company to make settlement is described next.

FIG. 10 is a schematic diagram showing the operation outline.

First, the store terminal 10 checks the charge code, the payment amount, and the encrypted information for each member included in the payment permission information 23 received from the representative terminal 30. For example, the store terminal 10 checks whether or not the value obtained by decrypting the signature data using a public key of the credit company included in the credit company certificate matches the digest value of the charge code, the payment amount, and the encrypted information. If they match, the store terminal 10 determines that the charge code, the payment amount, and the encrypted information have not been tampered with. The store terminal 10 then decrypts the encrypted information for each member included in the payment permission information 23.

Next, the store terminal 10 requests the credit company to make settlement, by transmitting settlement request information 24 (an example of the third amount information) including the accept code, the charge code issued by the store terminal 10, and a charge amount (an example of the third amount) to the credit company server 70. The accept code and the charge code may be acquired from the result of decrypting the encrypted information. As the charge amount, the (unencrypted) payment amount added to the encrypted information in the payment permission information 23 is used here. However, the (encrypted) payment amount included in the encrypted information in the payment permission information 23 may be used instead. Since the payment permission information 23 accompanied by the signature data is transmitted from the credit company server 70, simply verifying the signature data enables the payment between the representative and the store to be made. Therefore, the transaction between the credit company and the store need not be in real time.

The following describes screens displayed on the representative terminal 30 and the member terminal 50 during these operations.

FIG. 11 is a diagram showing a first example of the screen displayed on the representative terminal 30. This screen is displayed by a representative bill split application installed in the representative terminal 30.

In the drawing, a character string 341 indicates that the charge code is "201204011230123", and is displayed by the representative bill split application reading the description 211 in FIG. 3. A character string 342 indicates that the total amount is 6,000 yen, and is displayed by the representative bill split application reading the description 212 in FIG. 3. A character string 343 indicates that the signature data is valid, and is displayed based on the signature data obtained by the representative bill split application reading the description 213 in FIG. 3. In detail, for example the representative bill split application compares the value obtained by decrypting the signature data using the public key of the store with the digest value of the charge code and the total amount. If they match, the representative bill split application displays "OK" indicating that the charge code and the total amount have not been tampered with. If they do not match, the representative bill split application displays "NG" indicating that there is a possibility of the charge code and the total amount having been tampered with.

Moreover, a pull-down menu 344 is provided on the screen, enabling selection of a bill split method. "Even split" in which the total amount is evenly split between all members is selected in this example. Since there are four members relating to the payment, information indicating that each of the four members is to pay 1,500 yen for the total amount of 6,000 yen is displayed in a display field 345. In the display field 345, "representative" means the representative, indicating that the representative is also to pay the split amount.

In this state, when the representative selects the "representative" row and clicks a button 348, a screen for the representative same as the below-mentioned screen in FIG. 13 is displayed, to request the credit company to perform authentication for the payment. In detail, the payment request information 42 is transmitted to the credit company server 70.

When the representative selects the "member a" row and clicks the button 348, the member a is charged to pay the split amount. When the representative selects the "member b" row and clicks the button 348, the member b is charged to pay the split amount. When the representative selects the "member c" row and clicks the button 348, the member c is charged to pay the split amount. In detail, the split amount charge information 41 in FIG. 4 is transmitted to the member terminals 50$a$, 50$b$, and 50$c$ used respectively by the members a, b, and c.

At this point, all statuses in the rightmost column of the display field 345 are "Waiting". Subsequently, when the payment permission information 43 in FIG. 8 is received from the credit company server 70, the status corresponding to "representative" changes to "OK". Likewise, when the payment permission information 43 in FIG. 8 is received from the member terminal 50 of any member, the status corresponding to the member changes to "OK". Once the statuses of all members have become "OK", a button 349 is activated to be clickable. When the representative clicks the button 349, the permission for the payment of the total amount is notified to the store. In detail, the payment permission information 23 in FIG. 9 is transmitted to the store terminal 10.

Figure 12:
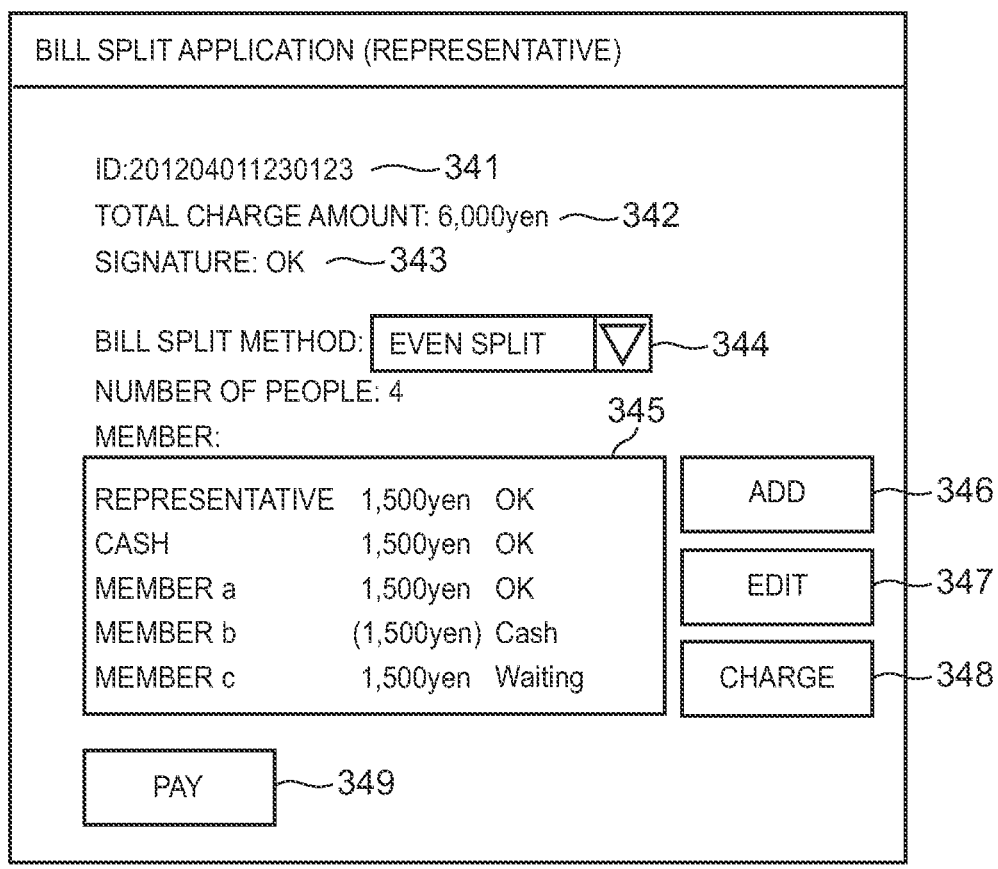
FIG. 12 is a diagram showing a second example of the screen displayed on the representative terminal in accordance with an illustrative embodiment.

FIG. 12 is a diagram showing a second example of the screen displayed on the representative terminal 30. This screen is displayed by the representative bill split application installed in the representative terminal 30, too.

The drawing shows the state where the representative selects the "member b" row, clicks a button 347, and edits the information so as to indicate that the member b has handed cash to another member. The drawing also shows the state where the member b has handed cash to the representative and the representative pays for the member b by a credit card. That is, the representative selects the "representative" row, and clicks a button 346 to add one row below the "representative" row. The representative then clicks the button 347, and edits the information so that the added row indicates payment of 1,500 yen for another member's cash.

The subsequent operations when clicking the button 348 and the button 349 are the same as those described with reference to FIG. 11.

FIG. 13 is a diagram showing a first example of the screen displayed on the member terminal 50 of a member. This screen is displayed by a member bill split application installed in the member terminal 50.

In the drawing, a character string 541 indicates that the charge code is "201204011230123", and is displayed by the member bill split application reading the description 411 in FIG. 4. A character string 542 indicates that the split amount is 1,500 yen out of the total amount of 6,000 yen, and is displayed by the member bill split application reading the description 412 and the description 414 in FIG. 4. A character string 543 indicates that the signature data is valid, and is displayed based on the signature data obtained by the member bill split application reading the description 413 in FIG. 4. In detail, for example the member bill split application compares the value obtained by decrypting the signature data using the public key of the store with the digest value of the charge code and the total amount. If they match, the member bill split application displays "OK" indicating that the charge code and the total amount have not been tampered with. If they do not match, the member bill split application displays "NG" indicating that there is a possibility of the charge code and the total amount having been tampered with.

Moreover, a pull-down menu 544 is provided on the screen, enabling selection of a credit company to be used. In this example, a credit company A is selected from a plurality of credit companies set by the member bill split application reading the description 415 in FIG. 4. Further, a pull-down menu 545 is provided on the screen, enabling selection of a payment method. Though lump sum payment is selected in this example, installment payment or the like may instead be selected. An input field 546 is also provided on the screen, enabling input of a card number (card ID) of the member in the credit company A. Though not shown in the drawing, an expiration date of the credit card or the like may also be input.

In this state, when the member clicks a button 547, the credit company is requested to perform authentication for the payment. In detail, the payment request information 61 in FIG. 5 is transmitted to the credit company server 70.

Subsequently, when the payment permission (authentication success) is received from the credit company, a button 548 is activated to be clickable. When the member clicks the button 548, the permission for the payment of the split amount is notified to the representative. In detail, the payment permission information 43 in FIG. 8 is transmitted to the representative terminal 30.

Suppose the member wants to pay the split amount of 1,500 yen separately by a credit card and electronic money. Such payment cannot be requested in the screen in FIG. 13, so that the member clicks a button 549.

Figure 14:
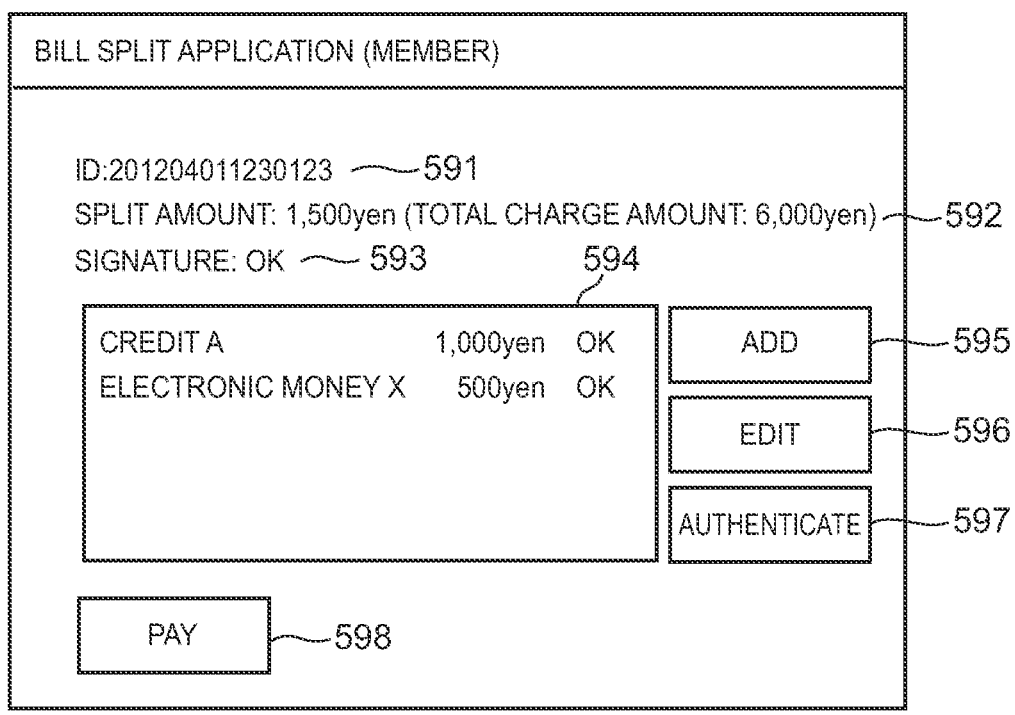
FIG. 14 is a diagram showing a second example of the screen displayed on the member terminal in accordance with an illustrative embodiment.

FIG. 14 is a diagram showing a second example of the screen displayed on the member terminal 50 of the member. This screen is displayed by the member bill split application installed in the member terminal 50 when the button 549 in FIG. 13 is clicked.

In the drawing, character strings 591 to 593 are the same as the character strings 541 to 543 in FIG. 13, and so their description is omitted.

Upon initial display of the screen, only the "credit card A" row is displayed in a display field 594. The member selects the row, and clicks a button 595 to add one row below the row. The member then clicks a button 596, and edits the information so that the added row indicates payment of 500 yen by electronic money X.

The subsequent operations when clicking a button 597 and a button 598 are respectively the same as the operations when clicking the button 547 and the button 548 in FIG. 13.

For example, payment by electronic money is made by withdrawing electronic money charged in a smartphone by an application or the like. In actuality, such payment is enabled by the store terminal 10 receiving signed payment permission information (of the same contents as the payment permission information 23, 43, and 63 shown in FIG. 6) from an electronic money company server. Moreover, actual settlement is made by the store terminal 10 transmitting settlement request information (of the same contents as the settlement request information 24 shown in FIG. 10) to the electronic money company server within the payment deadline. In the case of payment by electronic money, for example, the application may sign using a terminal certificate held in the smartphone.

Though part of the amount to be paid by a credit card is paid by electronic money in this example, the present invention is not limited to such. For instance, the amount to be paid by one credit card may be split so as to be paid by a plurality of credit cards, or the amount to be paid by one credit card may be split so as to be paid by a plurality of kinds of electronic money.

Though the screen in FIG. 14 is displayed by clicking the button 549 in FIG. 13 in this example, the present invention is not limited to such. For instance, the screen selected by the member from the screen in FIG. 13 and the screen in FIG. 14 may be displayed from the beginning.

Figure 15:
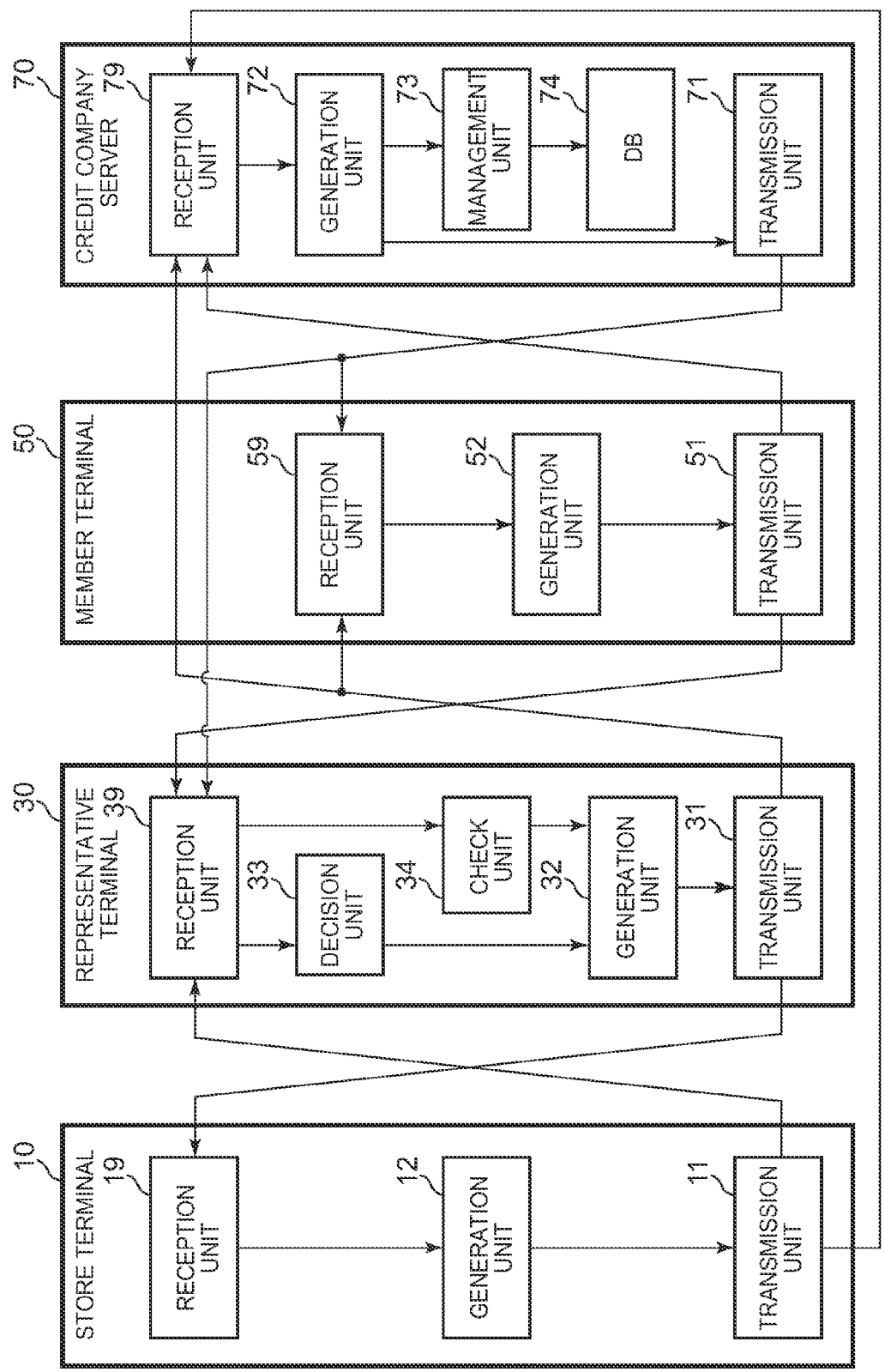
FIG. 15 is a block diagram showing an example of a functional structure of each device in accordance with an illustrative embodiment.

FIG. 15 is a block diagram showing an example of a functional structure of each device included in a computer system in accordance with an illustrative embodiment.

As shown in the drawing, the store terminal 10 includes a transmission unit 11, a generation unit 12, and a reception unit 19. The representative terminal 30 includes a transmission unit 31, a generation unit 32, a decision unit 33, a check unit 34, and a reception unit 39. The member terminal 50 includes a transmission unit 51, a generation unit 52, and a reception unit 59. The credit company server 70 includes a transmission unit 71, a generation unit 72, a management unit 73, the database 74, and a reception unit 79.

The components of the store terminal 10 are described first.

The transmission unit 11 transmits information generated by the generation unit 12, to the representative terminal 30 or the credit company server 70.

The generation unit 12 generates the total amount charge information 21 as information which the transmission unit 11 transmits to the representative terminal 30, and the settlement request information 24 as information which the transmission unit 11 transmits to the credit company server 70.

The reception unit 19 receives the payment permission information 23 from the representative terminal 30.

The components of the representative terminal 30 are described next.

The transmission unit 31 transmits information generated by the generation unit 32, to the store terminal 10, the member terminal 50, or the credit company server 70.

The generation unit 32 generates the payment permission information 23 as information which the transmission unit 31 transmits to the store terminal 10, the split amount charge information 41 as information which the transmission unit 31 transmits to the member terminal 50, and the payment request information 42 as information which the transmission unit 31 transmits to the credit company server 70.

The decision unit 33 decides the split amount for each member, according to the operation of the representative with reference to the total amount charge information 21 received by the reception unit 39.

The check unit 34 checks the consistency of the total amount charge information 21 and the payment permission information 43 received by the reception unit 39.

The reception unit 39 receives the total amount charge information 21 from the store terminal 10, and the payment permission information 43 from the member terminal 50 or the credit company server 70.

The components of the member terminal 50 are described next.

The transmission unit 51 transmits information generated by the generation unit 52, to the representative terminal 30 or the credit company server 70.

The generation unit 52 generates the payment permission information 43 as information which the transmission unit 51 transmits to the representative terminal 30, and the payment request information 61 as information which the transmission unit 51 transmits to the credit company server 70.

The reception unit 59 receives the split amount charge information 41 from the representative terminal 30, and the payment permission information 63 from the credit company server 70.

The components of the credit company server 70 are described next.

The transmission unit 71 transmits information generated by the generation unit 72, to the representative terminal 30 or the member terminal 50.

The generation unit 72 generates the payment permission information 43 as information which the transmission unit 71 transmits to the representative terminal 30, and the payment permission information 63 as information which the transmission unit 71 transmits to the member terminal 50.

The management unit 73 manages information necessary for settlement in the database 74, and makes settlement by comparing the settlement request information 24 received by the reception unit 79 from the store terminal 10 with the information in the database 74.

The database 74 stores the information necessary for settlement.

The reception unit 79 receives the settlement request information 24 from the store terminal 10, the payment request information 42 from the representative terminal 30, and the payment request information 61 from the member terminal 50.

Note that the functional units of each device are realized by cooperative operation of software and hardware resources. In detail, the functional units of each device are realized, for example, by a CPU 90a (see FIG. 24) of the device reading a predetermined program from a magnetic disk device 90g (see FIG. 24) into a main memory 90c (see FIG. 24) and executing the program. The database 74 is realized, for example, by the magnetic disk device 90g (see FIG. 24).

Figure 16:
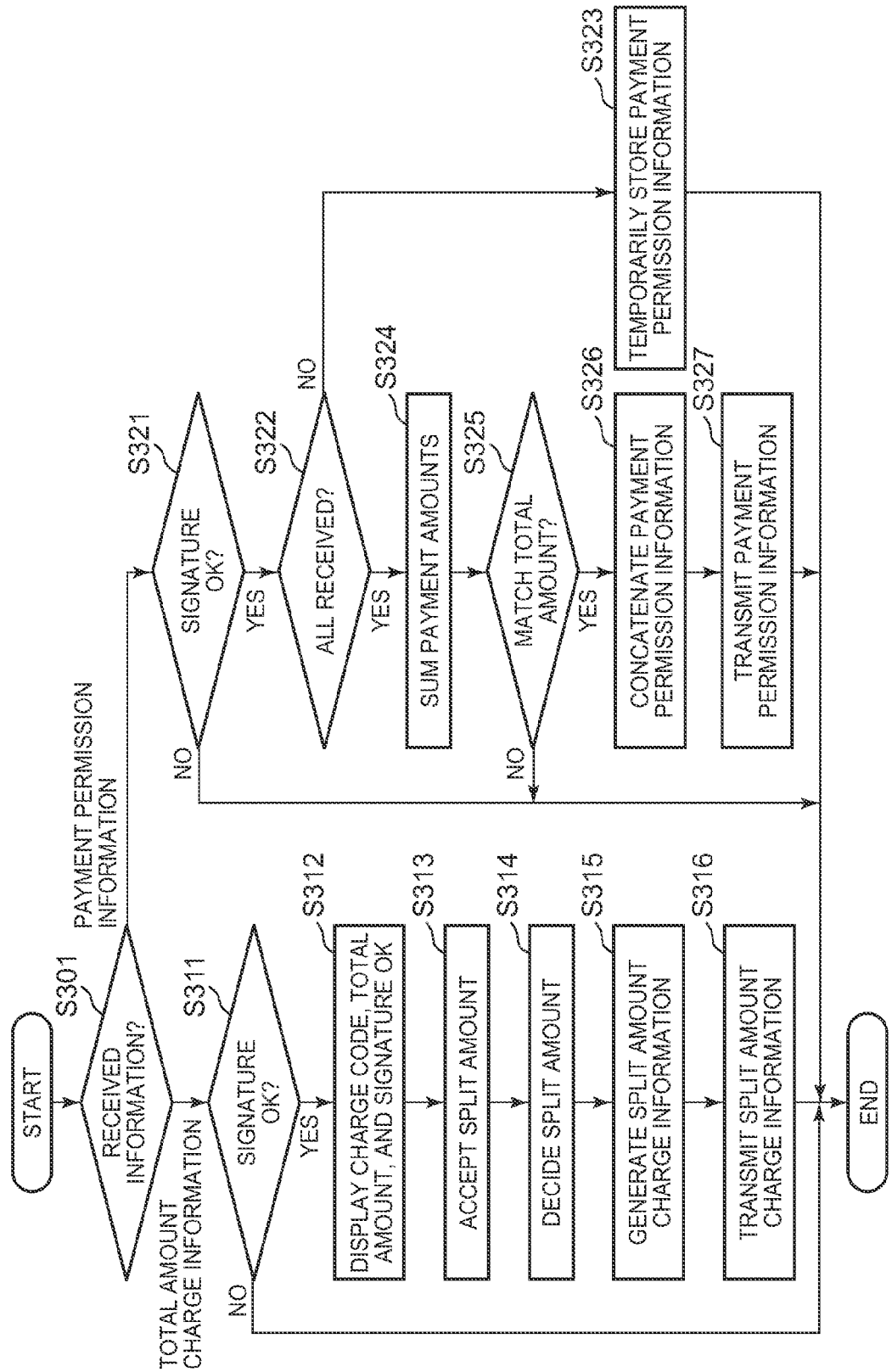
FIG. 16 is a flowchart showing an example of an operation of the representative terminal in accordance with an illustrative embodiment.

FIG. 16 is a flowchart showing an example of an operation of the representative terminal 30.

As shown in the drawing, in the representative terminal 30, the reception unit 39 receives information from another device, and determines what kind of information the received information is (step 301).

The case where the information received by the reception unit 39 is the total amount charge information 21 received from the store terminal 10 is described first. The total amount charge information 21 includes the charge code, the total amount, the signature data, the available credit company, and the store certificate, as mentioned above.

In this case, the reception unit 39 determines whether or not the signature data included in the total amount charge information 21 is valid, using the store certificate included in the total amount charge information 21 (step 311). If the signature data is not valid, the reception unit 39 ends the process.

If the signature data is valid, on the other hand, the decision unit 33 displays the charge code and the total amount included in the total amount charge information 21 and the information that the signature data is valid, on the screen (step 312). At this time, the charge code and the total amount are stored in a total amount storage unit not shown. When the representative performs the operation of designating the split amount for each member on the screen, the decision unit 33 accepts the operation (step 313). The decision unit 33 accordingly decides the split amount for each member (step 314). At this time, the split amount for each member is stored in a split amount storage unit not shown.

Next, the generation unit 32 generates the split amount charge information 41 for each member (step 315). The split amount charge information 41 includes the charge code, the total amount, the signature data, the available credit company, the store certificate, and the split amount.

After this, the transmission unit 31 transmits, for each member, the split amount charge information 41 to the member terminal 50 of the member (step 316), and ends the process.

The case where the information received by the reception unit 39 is the payment permission information 43 received from the member terminal 50 or the credit company server 70 is described next. The payment permission information 43 includes the charge code, the payment amount, the encrypted information, the signature data, and the credit company certificate, as mentioned above.

In this case, the reception unit 39 determines whether or not the signature data included in the payment permission information 43 is valid, using the credit company certificate included in the payment permission information 43 (step 321). If the signature data is not valid, the reception unit 39 ends the process.

If the signature data is valid, on the other hand, the reception unit 39 determines whether or not the payment permission information 43 has been received from all member terminals 50, by referencing to the split amount storage unit (step 322).

If the payment permission information 43 has not been received from all member terminals 50, the reception unit 39 temporarily stores the payment permission information 43 in a temporary storage unit not shown (step 323). If the payment permission information 43 has been received from all member terminals 50, the check unit 34 calculates the sum of the payment amounts from the payment amount included in the currently received payment permission information 43 and the payment amount included in the payment permission information 43 temporarily stored in the temporary storage unit (step 324), and determines whether or not the sum matches the total amount stored in the total amount storage unit (step 325).

If the sum of the payment amounts included in the payment permission information 43 does not match the total amount stored in the total amount storage unit, the check unit 34 ends the process.

If the sum of the payment amounts included in the payment permission information 43 matches the total amount stored in the total amount storage unit, on the other hand, the generation unit 32 generates the payment permission information 23 by concatenating the currently received payment permission information 43 and the payment permission information 43 temporarily stored in the temporary storage unit (step 326).

After this, the transmission unit 31 transmits the payment permission information 23 to the store terminal 10 (step 327), and ends the process.

Though whether or not the signature data included in the total amount charge information 21 is valid and whether or not the signature data included in the payment permission information 43 is valid are determined in this operation example, such determination need not necessarily be performed.

Figure 17:
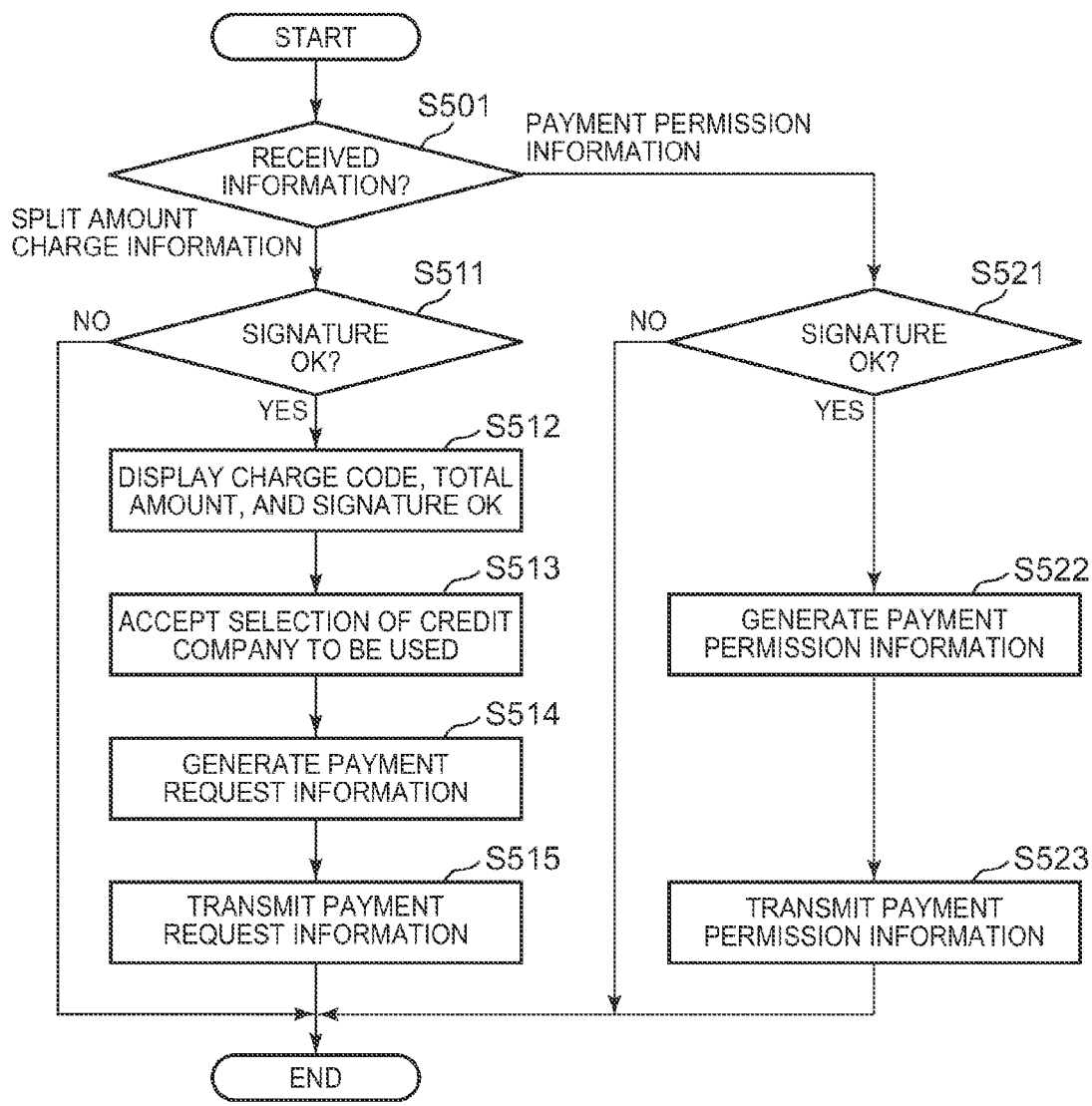
FIG. 17 is a flowchart showing an example of an operation of the member terminal in accordance with an illustrative embodiment.

FIG. 17 is a flowchart showing an example of an operation of the member terminal 50.

As shown in the drawing, in the member terminal 50, the reception unit 59 receives information from another device, and determines what kind of information the received information is (step 501).

The case where the information received by the reception unit 59 is the split amount charge information 41 received from the representative terminal 30 is described first. The split amount charge information 41 includes the charge code, the total amount, the signature data, the available credit company, the store certificate, and the split amount, as mentioned above.

In this case, the reception unit 59 determines whether or not the signature data included in the split amount charge information 41 is valid, using the store certificate included in the split amount charge information 41 (step 511). If the signature data is not valid, the reception unit 59 ends the process.

If the signature data is valid, on the other hand, the generation unit 52 displays the charge code and the total amount included in the split amount charge information 41 and the information that the signature data is valid, on the screen (step 512).

Next, the generation unit 52 displays the available credit company included in the split amount charge information 41, on the screen. When the member performs the operation of selecting the credit company to be used and inputting the credit card information on the screen, the generation unit 52 accepts the operation (step 513). The generation unit 52 accordingly generates the payment request information 61 (step 514). The payment request information 61 includes the charge code, the total amount, the signature data, the store certificate, the split amount, and the credit card information.

After this, the transmission unit 51 transmits the payment request information 61 to the credit company server 70 (step 515), and ends the process.

The case where the information received by the reception unit 59 is the payment permission information 63 received from the credit company server 70 is described next. The payment permission information 63 includes the charge code, the payment amount, the encrypted information, the signature data, and the credit company certificate, as mentioned above.

In this case, the reception unit 59 determines whether or not the signature data included in the payment permission information 63 is valid, using the credit company certificate included in the payment permission information 63 (step 521). If the signature data is not valid, the reception unit 59 ends the process.

If the signature data is valid, on the other hand, the generation unit 52 generates the payment permission information 43 (step 522). The payment permission information 43 is information of the same contents as the payment permission information 63.

After this, the transmission unit 51 transmits the payment permission information 43 to the representative terminal 30 (step 523), and ends the process.

Though whether or not the signature data included in the split amount charge information 41 is valid and whether or not the signature data included in the payment permission information 63 is valid are determined in this operation example, such determination need not necessarily be performed.

In accordance with another illustrative embodiment, the previous embodiment is realized by advance payment. In the previous embodiment, in the state where the total amount has been determined, the payment of the split amount calculated by splitting the total amount is requested of the credit company, and then the settlement of the split amount is requested of the credit company. In accordance with another embodiment, the payment of up to a payment upper limit amount according to an advance collected amount is requested of the credit company in the state where the total amount has not been determined and, after the total amount is determined, the settlement of the split amount calculated by splitting the total amount is requested of the credit company.

An operation outline when each of the representative and the members requests the credit company to make payment and the credit company permits the payment in the state where the total amount has not been determined is described first.

Figure 18:
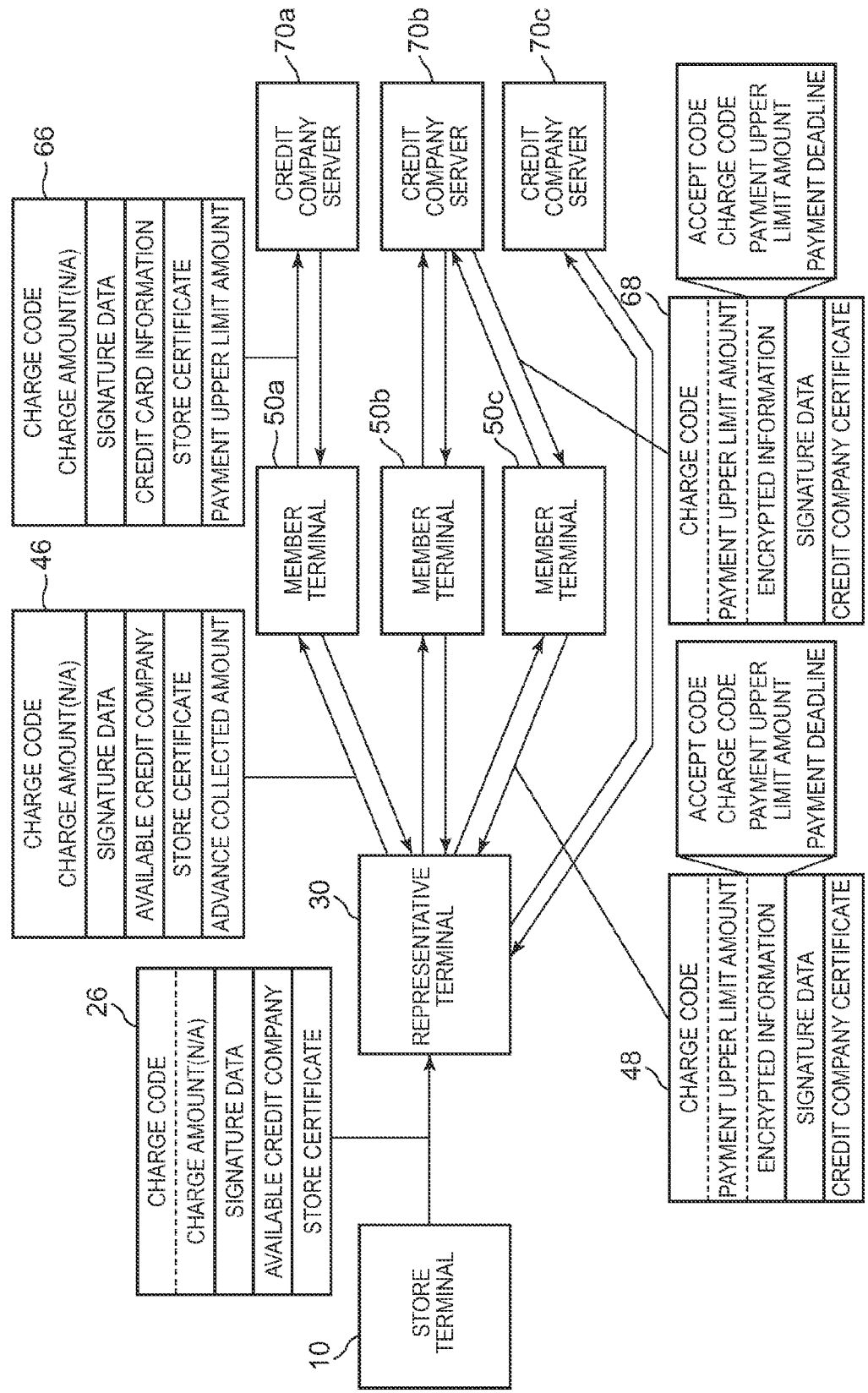
FIG. 18 is a diagram showing an operation outline when each of the representative and the members requests the credit company to make payment in a state where a total amount has not been determined in accordance with an illustrative embodiment.

FIG. 18 is a schematic diagram showing the operation outline, and FIG. 19 is a diagram showing an example of the database 74 in the credit company server 70.

As shown in FIG. 18, first the store terminal 10 transmits store notification information 26 for notifying store-related information to the representative terminal 30. Here, the store notification information 26 includes the same charge code as described in the previously described embodiment, and the total amount which has not been determined and so is not set to a specific amount. It is desirable that the same signature data as described in the previously described embodiment is added to the charge code and the total amount. The store notification information 26 also includes an available credit company which is a list of credit companies available for payment. The store notification information 26 further includes the same store certificate as described in the previously described embodiment.

Next, in the representative terminal 30, the representative decides the advance collected amount (an example of the first amount) for each member, for example by predicting the total amount to be charged by the store. The representative terminal 30 accordingly transmits advance collected amount notification information 46 (an example of the first amount information) for notifying the advance collected amount, to the member terminal 50 of each member. Here, the advance collected amount notification information 46 includes the advance collected amount, in addition to the charge code, the total amount, the signature data, the available credit company, and the store certificate in the store notification information 26.

Next, in the member terminal 50, each member decides a credit company to be used, by referencing to the available credit company included in the advance collected amount notification information 46. The member then logs in to the credit company server 70 of the credit company, and transmits payment request information 66 (an example of the second amount information) for requesting payment of up to the payment upper limit amount (an example of the second amount) decided by the member according to the advance collected amount, to the credit company server 70. Note that each member has agreed that the credit company allowed to pay up to the payment upper limit amount. Here, the payment request information 66 includes the charge code, the total amount, the signature data, and the store certificate in the advance collected amount notification information 46, but includes the payment upper limit amount instead of the advance collected amount. Besides, since the credit company to be used has been decided, the payment request information 66 does not include the available credit company, but includes credit card information such as a name, a card ID, an expiration date, and the like registered in the credit company to be used.

Following this, the credit company server 70 checks whether or not the payment is possible, based on the store certificate. For instance, the credit company server 70 checks whether or not the value obtained by decrypting the signature data using the public key of the store included in the store certificate matches the digest value of the charge code and the total amount. If they match, the credit company server 70 determines that the payment is possible, on the ground that the charge code and the total amount have not been tampered with. Having determined that the payment is possible, the credit company server 70 reserves the payment.

In the case where the representative makes payment, too, the representative decides a payment upper limit amount for the representative in the representative terminal 30. The representative then decides a credit company to be used by referencing to the available credit company included in the store notification information 26, logs in to the credit company server 70 of the credit company, and transmits payment request information 47 (not shown) for requesting payment of up to the payment upper limit amount for the representative, to the credit company server 70. Here, the payment request information 47 is information of the same contents as the payment request information 66.

In the case of reserving the payment, i.e. in the case of permitting the payment, the credit company server 70 generates encrypted information by encrypting an accept code for the payment permission, the charge code received from the store, and the payment upper limit amount using the public key of the store. The accept code and the public key of the store used here are the same as those used in the previously described embodiment. The information to be encrypted may include a payment deadline which is a deadline to pay. The credit company server 70 accordingly transmits payment permission information 68 (an example of the second amount information) that includes not only the encrypted information but also the charge code and the payment upper limit amount accompanied by signature data of the credit company so that the representative can recognize the payment upper limit amount (an example of the second amount), to each member terminal 50.

In the case where the representative makes payment, too, the credit company server 70 also transmits payment permission information 48 of the same contents as the payment permission information 68 to the representative terminal 30.

Moreover, the accept code, the charge code, the store ID, the card ID, the payment upper limit amount, and the payment deadline are registered in the database 74, as shown in FIG. 19.

Next, the member terminal 50 of each member transmits payment permission information 48 (an example of the second amount information) to the representative terminal 30. The payment permission information 48 is the same as the payment permission information 68 received from the credit company server 70.

The representative terminal 30 waits for receiving the payment permission information 48 from the member terminals 50 of all members.

In the case where the representative makes payment, too, the representative terminal 30 also waits for receiving the payment permission information 48 from the credit company server 70.

An operation outline when the representative notifies the store of the split amount after the total amount is determined is described next.

Figure 20:
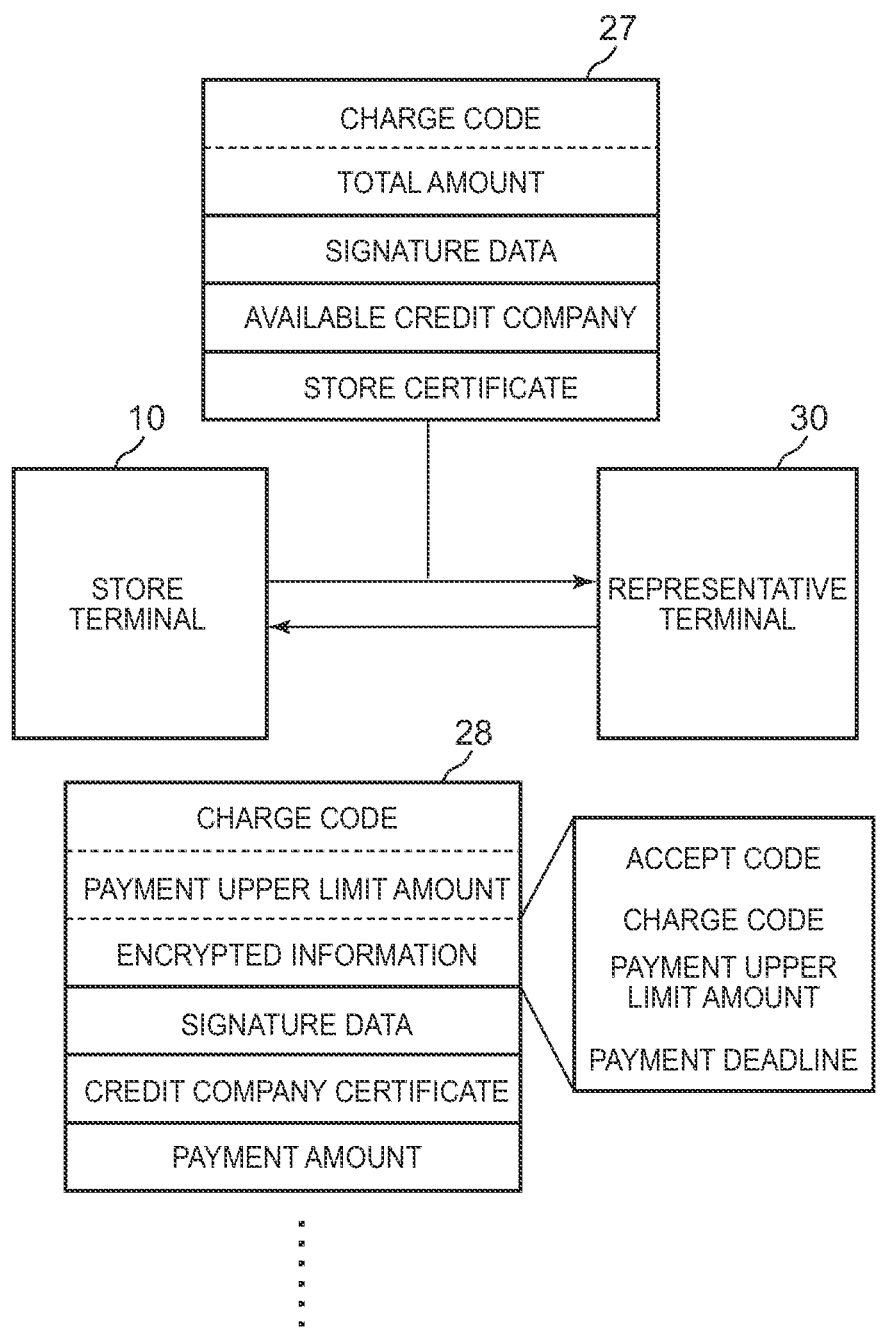
FIG. 20 is a diagram showing an operation outline when the representative notifies the store of a split amount after the total amount is determined in accordance with an illustrative embodiment.

FIG. 20 is a schematic diagram showing the operation outline.

As shown in the drawing, first the store terminal 10 transmits total amount charge information 27 for charging the total amount to the representative terminal 30. Here, the total amount charge information 27 includes not only the total amount but also the same charge code as described in the previously described embodiment. It is desirable that the same signature data as described in the previously described embodiment is added to the charge code and the total amount. The total amount charge information 27 also includes the available credit company which is the list of credit companies available for payment. The total amount charge information 27 further includes the same store certificate as described in the previously described embodiment.

Next, in the representative terminal 30, the representative decides the split amount (payment amount) for each member, by splitting the total amount charged in the total amount charge information 27 so as to be within the advance collected amount collected from each member. The representative terminal 30 accordingly transmits payment permission information 28 (an example of the third amount information) including the payment amount (an example of the third amount) for each member, to the store terminal 10. This payment permission information 28 is generated by adding the decided payment amount to the payment permission information 48 received from the member terminal 50 of each member and concatenating the payment permission information 48.

In this advance payment method, the representative collects the advance collected amount from each member, so that there is no transaction between the representative and each member after the total amount is determined. Therefore, this system is effective even when the member terminal 50 of each member is unavailable or offline at the time of determination of the total amount.

If the total amount charged in the total amount charge information 27 is higher than expected and cannot be split within the advance collected amount, the representative decides the split amount for each member within the range that does not exceed the payment upper limit amount included in the payment permission information 48. Note that, in the case where the split amount exceeds the advance collected amount, it is desirable to notify the split amount to each member and obtain each member's consent at this point.

An operation outline when the store requests the credit company to make settlement is described next.

This operation outline is the same as that shown in FIG. 10, and so its detailed description is omitted here. Note, however, that the store terminal 10 transmits settlement request information 29 (not shown) for requesting settlement of an amount that does not exceed the payment upper limit amount, to the credit company server 70.

Figure 21:
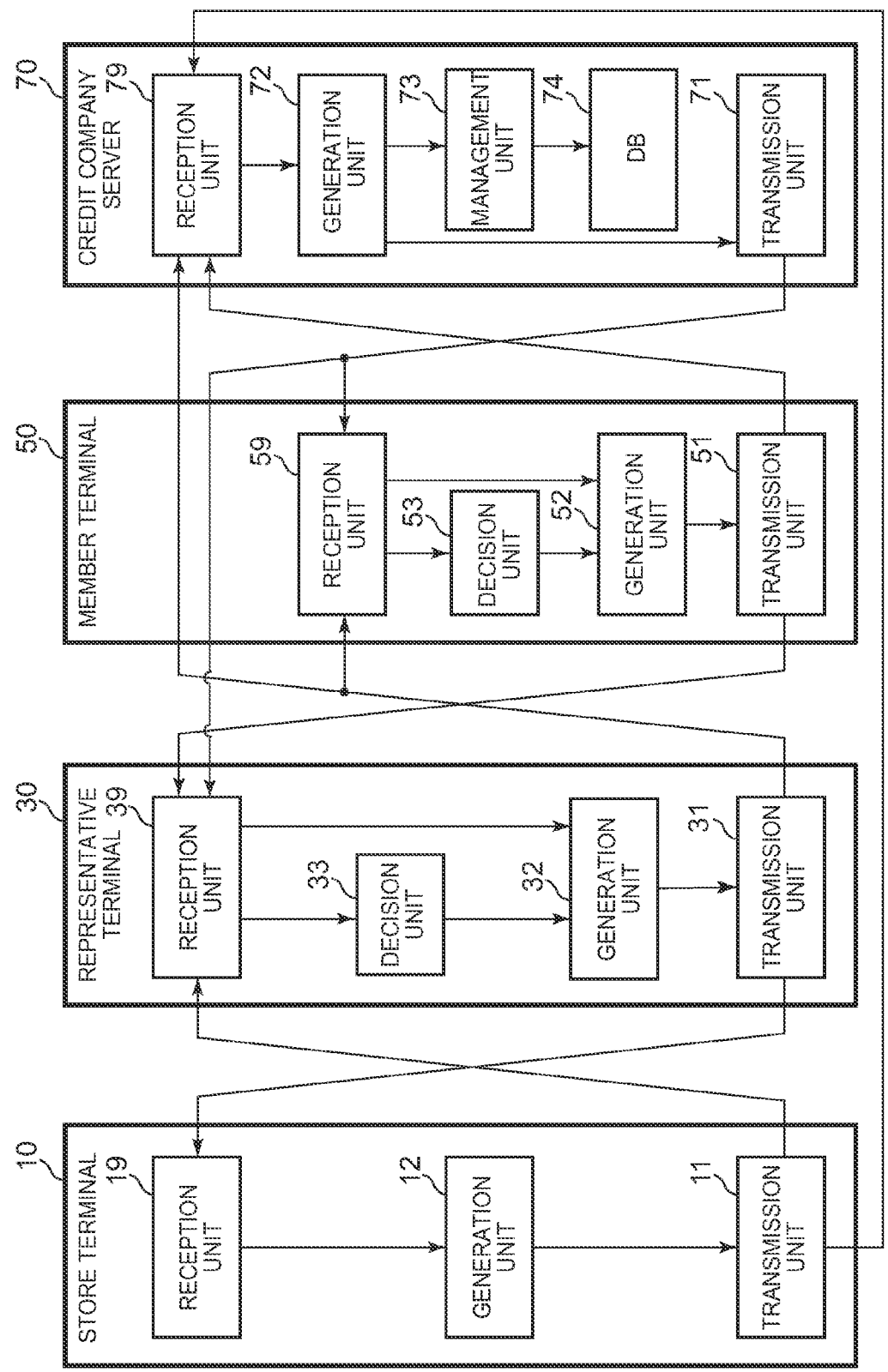
FIG. 21 is a block diagram showing an example of a functional structure of each device in accordance with an illustrative embodiment.

FIG. 21 is a block diagram showing an example of a functional structure of each device included in a computer system in Embodiment 2.

As shown in the drawing, the store terminal 10 includes the transmission unit 11, the generation unit 12, and the reception unit 19. The representative terminal 30 includes the transmission unit 31, the generation unit 32, the decision unit 33, and the reception unit 39. The member terminal 50 includes the transmission unit 51, the generation unit 52, a decision unit 53, and the reception unit 59. The credit company server 70 includes the transmission unit 71, the generation unit 72, the management unit 73, the database 74, and the reception unit 79.

The components of the store terminal 10 are described first.

The transmission unit 11 transmits information generated by the generation unit 12, to the representative terminal 30 or the credit company server 70.

The generation unit 12 generates the store notification information 26 or the total amount charge information 27 as information which the transmission unit 11 transmits to the representative terminal 30, and the settlement request information 29 as information which the transmission unit 11 transmits to the credit company server 70.

The reception unit 19 receives the payment permission information 28 from the representative terminal 30.

The components of the representative terminal 30 are described next.

The transmission unit 31 transmits information generated by the generation unit 32, to the store terminal 10, the member terminal 50, or the credit company server 70.

The generation unit 32 generates the payment permission information 28 as information which the transmission unit 31 transmits to the store terminal 10, the advance collected amount notification information 46 as information which the transmission unit 31 transmits to the member terminal 50, and the payment request information 47 as information which the transmission unit 31 transmits to the credit company server 70.

The decision unit 33 decides the split amount for each member, according to the operation of the representative with reference to the total amount charge information 27 received by the reception unit 39.

The reception unit 39 receives the store notification information 26 or the total amount charge information 27 from the store terminal 10, and the payment permission information 48 from the member terminal 50 or the credit company server 70.

The components of the member terminal 50 are described next.

The transmission unit 51 transmits information generated by the generation unit 52, to the representative terminal 30 or the credit company server 70.

The generation unit 52 generates the payment permission information 48 as information which the transmission unit 51 transmits to the representative terminal 30, and the payment request information 66 as information which the transmission unit 51 transmits to the credit company server 70.

The decision unit 53 decides the payment upper limit amount for the member, according to the operation of the member with reference to the advance collected amount notification information 46 received by the reception unit 59.

The reception unit 59 receives the advance collected amount notification information 46 from the representative terminal 30, and the payment permission information 68 from the credit company server 70.

The components of the credit company server 70 are described next.

The transmission unit 71 transmits information generated by the generation unit 72, to the representative terminal 30 or the member terminal 50.

The generation unit 72 generates the payment permission information 48 as information which the transmission unit 71 transmits to the representative terminal 30, and the payment permission information 68 as information which the transmission unit 71 transmits to the member terminal 50.

The management unit 73 manages information necessary for settlement in the database 74, and makes settlement by comparing the settlement request information 29 received by the reception unit 79 from the store terminal 10 with the information in the database 74.

The database 74 stores the information necessary for settlement.

The reception unit 79 receives the settlement request information 29 from the store terminal 10, the payment request information 47 from the representative terminal 30, and the payment request information 66 from the member terminal 50.

Note that the functional units of each device are realized by cooperative operation of software and hardware resources. In detail, the functional units of each device are realized, for example, by the CPU 90a (see FIG. 24) of the device reading a predetermined program from the magnetic disk device 90g (see FIG. 24) into the main memory 90c (see FIG. 24) and executing the program. The database 74 is realized, for example, by the magnetic disk device 90g (see FIG. 24).

Figure 22:
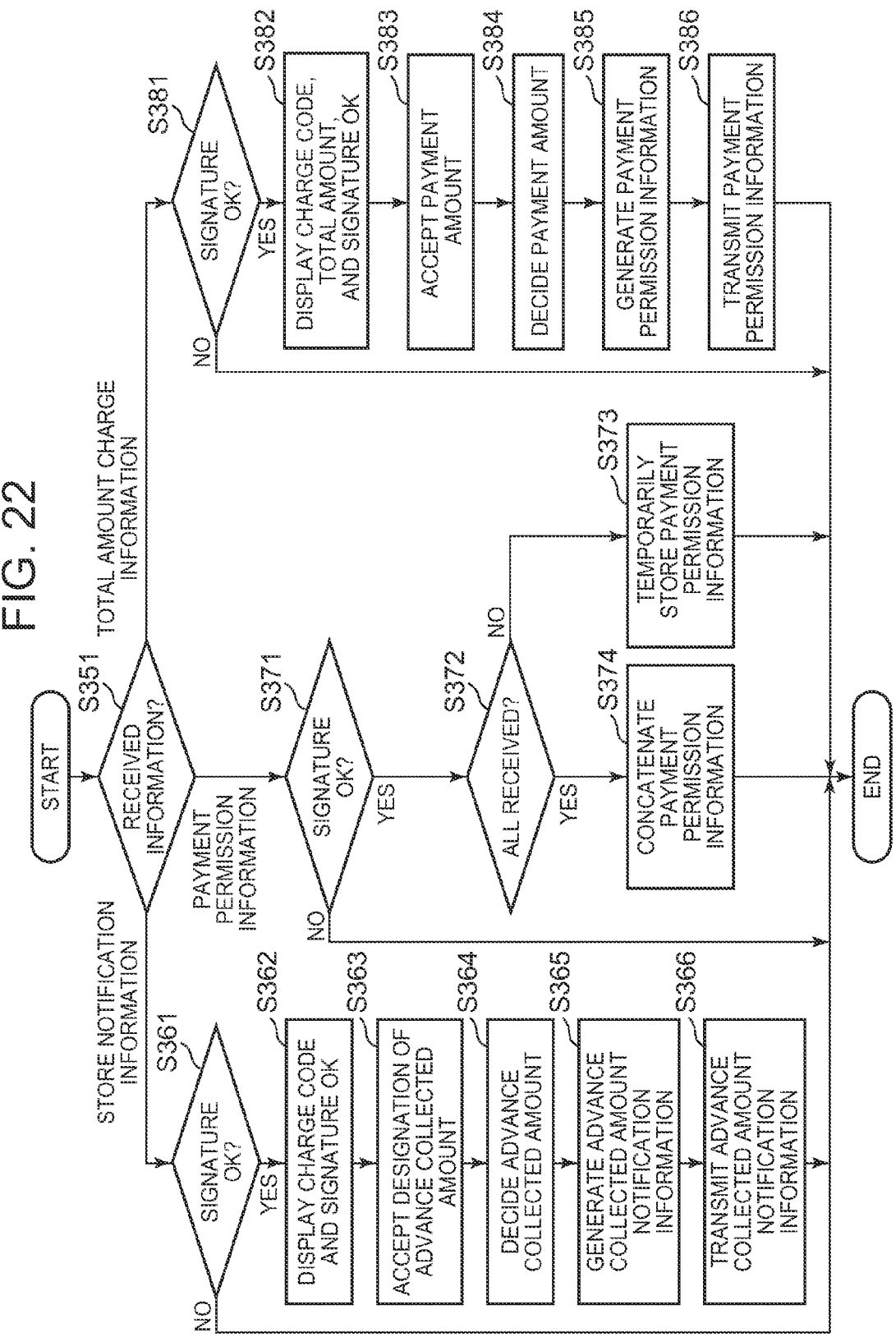
FIG. 22 is a flowchart showing an example of an operation of the representative terminal in accordance with an illustrative embodiment.

FIG. 22 is a flowchart showing an example of an operation of the representative terminal 30.

As shown in the drawing, in the representative terminal 30, the reception unit 39 receives information from another device, and determines what kind of information the received information is (step 351).

The case where the information received by the reception unit 39 is the store notification information 26 received from the store terminal 10 is described first. The store notification information 26 includes the charge code, the signature data, the available credit company, and the store certificate, as mentioned above.

In this case, the reception unit 39 determines whether or not the signature data included in the store notification information 26 is valid, using the store certificate included in the store notification information 26 (step 361). If the signature data is not valid, the reception unit 39 ends the process.

If the signature data is valid, on the other hand, the decision unit 33 displays the charge code included in the store notification information 26 and the information that the signature data is valid, on the screen (step 362). When the representative performs the operation of designating the advance collected amount for each member on the screen, the decision unit 33 accepts the operation (step 363). The decision unit 33 accordingly decides the advance collected amount for each member (step 364). At this time, the advance collected amount for each member is stored in an advance collected amount storage unit not shown.

Next, the generation unit 32 generates the advance collected amount notification information 46 for each member (step 365). The advance collected amount notification information 46 includes the charge code, the signature data, the available credit company, the store certificate, and the advance collected amount.

After this, the transmission unit 31 transmits, for each member, the advance collected amount notification information 46 to the member terminal 50 of the member (step 366), and ends the process.

The case where the information received by the reception unit 39 is the payment permission information 48 received from the member terminal 50 or the credit company server 70 is described next. The payment permission information 48 includes the charge code, the payment upper limit amount, the encrypted information, the signature data, and the credit company certificate, as mentioned above.

In this case, the reception unit 39 determines whether or not the signature data included in the payment permission information 48 is valid, using the credit company certificate included in the payment permission information 48 (step 371). If the signature data is not valid, the reception unit 39 ends the process.

If the signature data is valid, on the other hand, the reception unit 39 determines whether or not the payment permission information 48 has been received from all member terminals 50, by referencing to the advance collected amount storage unit (step 372).

If the payment permission information 48 has not been received from all member terminals 50, the reception unit 39 temporarily stores the payment permission information 48 in a temporary storage unit not shown (step 373). If the payment permission information 48 has been received from all member terminals 50, the generation unit 32 concatenates the currently received payment permission information 48 and the payment permission information 48 temporarily stored in the temporary storage unit, and writes the concatenation result back to the temporary storage unit (step 374).

The case where the information received by the reception unit 39 is the total amount charge information 27 received from the store terminal 10 is described next. The total amount charge information 27 includes the charge code, the total amount, the signature data, the available credit company, and the store certificate, as mentioned above.

In this case, the reception unit 39 determines whether or not the signature data included in the total amount charge information 27 is valid, using the store certificate included in the total amount charge information 27 (step 381). If the signature data is not valid, the reception unit 39 ends the process.

If the signature data is valid, on the other hand, the decision unit 33 displays the charge code and the total amount included in the total amount charge information 27 and the information that the signature data is valid, on the screen (step 382). When the representative performs the operation of designating the split amount (payment amount) for each member on the screen, the decision unit 33 accepts the operation (step 383). The decision unit 33 accordingly decides the payment amount for each member (step 384).

Next, the generation unit 32 adds the payment amount to the part corresponding to each member in the information written back to the temporary storage unit in step 374, to generate the payment permission information 28 (step 385).

After this, the transmission unit 31 transmits the payment permission information 28 to the store terminal 10 (step 386), and ends the process.

Though whether or not the signature data included in the store notification information 26 is valid, whether or not the signature data included in the payment permission information 48 is valid, and whether or not the signature data included in the total amount charge information 27 is valid are determined in this operation example, such determination need not necessarily be performed.

Figure 23:
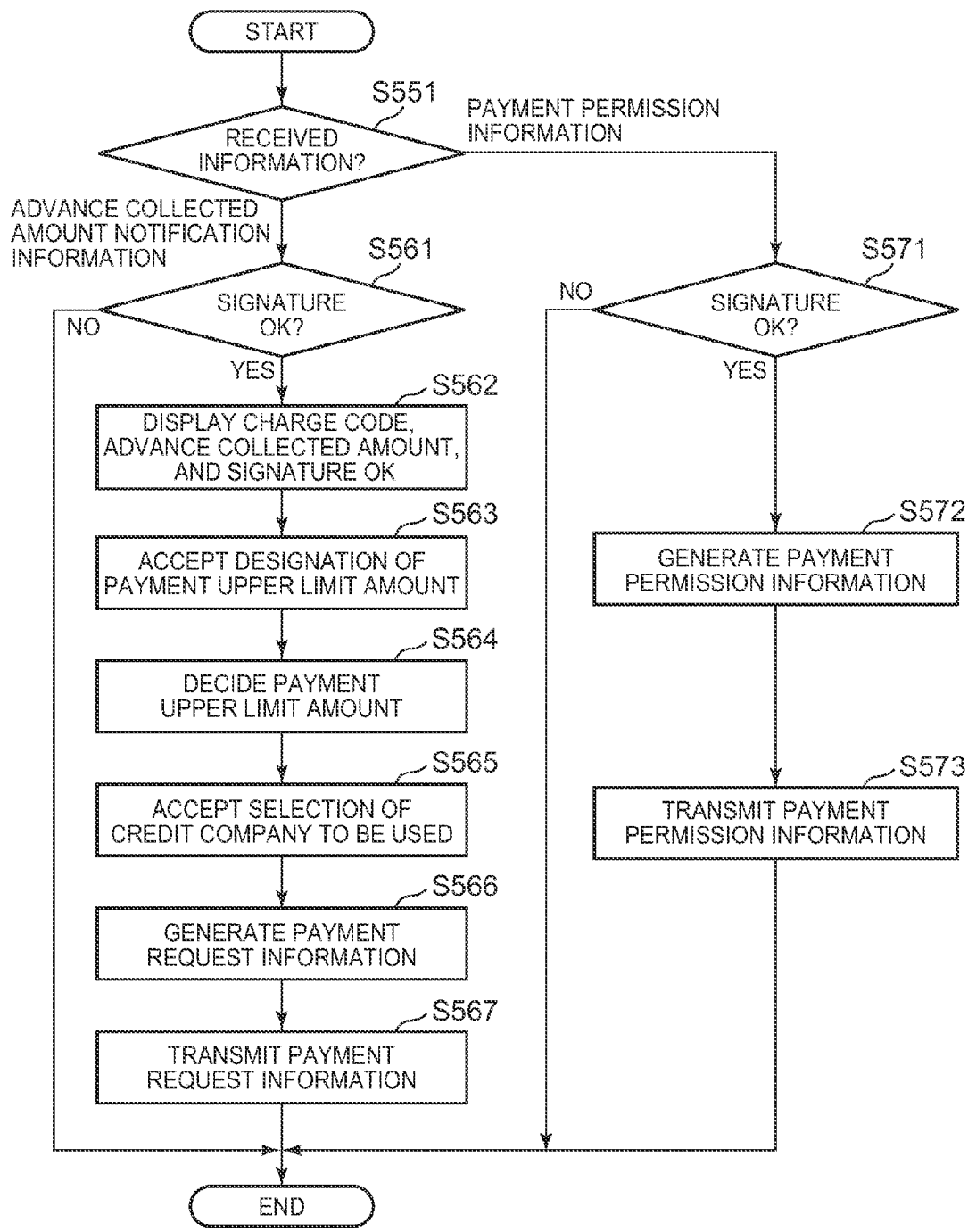
FIG. 23 is a flowchart showing an example of an operation of the member terminal in accordance with an illustrative embodiment.

FIG. 23 is a flowchart showing an example of an operation of the member terminal 50.

As shown in the drawing, in the member terminal 50, the reception unit 59 receives information from another device, and determines what kind of information the received information is (step 551).

The case where the information received by the reception unit 59 is the advance collected amount notification information 46 received from the representative terminal 30 is described first. The advance collected amount notification information 46 includes the charge code, the signature data, the available credit company, the store certificate, and the advance collected amount, as mentioned above.

In this case, the reception unit 59 determines whether or not the signature data included in the advance collected amount notification information 46 is valid, using the store certificate included in the advance collected amount notification information 46 (step 561). If the signature data is not valid, the reception unit 59 ends the process.

If the signature data is valid, on the other hand, the decision unit 53 displays the charge code and the advance collected amount included in the advance collected amount notification information 46 and the information that the signature data is valid, on the screen (step 562). When the member performs the operation of designating the payment upper limit amount on the screen, the decision unit 53 accepts the operation (step 563). The decision unit 53 accordingly decides the payment upper limit amount for the member (step 564).

Next, the generation unit 52 displays the available credit company included in the advance collected amount notification information 46, on the screen. When the member performs the operation of selecting the credit company to be used and inputting the credit card information on the screen, the generation unit 52 accepts the operation (step 565). The generation unit 52 accordingly generates the payment request information 66 (step 566). The payment request information 66 includes the charge code, the signature data, the store certificate, the payment upper limit amount, and the credit card information.

After this, the transmission unit 51 transmits the payment request information 66 to the credit company server 70 (step 567), and ends the process.

The case where the information received by the reception unit 59 is the payment permission information 68 received from the credit company server 70 is described next. The payment permission information 68 includes the charge code, the payment upper limit amount, the encrypted information, the signature data, and the credit company certificate, as mentioned above.

In this case, the reception unit 59 determines whether or not the signature data included in the payment permission information 68 is valid, using the credit company certificate included in the payment permission information 68 (step 571). If the signature data is not valid, the reception unit 59 ends the process.

If the signature data is valid, on the other hand, the generation unit 52 generates the payment permission information 48 (step 572). The payment permission information 48 is information of the same contents as the payment permission information 68.

After this, the transmission unit 51 transmits the payment permission information 48 to the representative terminal 30 (step 573), and ends the process.

Though whether or not the signature data included in the advance collected amount notification information 46 is valid and whether or not the signature data included in the payment permission information 68 is valid are determined in this operation example, such determination need not necessarily be performed.

As described above, in the above embodiments, bill split payment is not performed by each of the plurality of members paying to the store, but performed as follows. Based on the premise that the representative terminal 30 communicates with the store terminal 10 to make payment for the plurality of members, information necessary for payment settlement is transmitted to the store terminal 10 in a state of being encrypted using the public key of the store, via the representative terminal 30. This enables the information necessary for payment settlement to be provided to the store, without its contents being known to the representative.

Moreover, in the above embodiments, the split amount is decided on the screen as shown in FIG. 14. This enables payment settlement to be made not only by the credit company but also by, for example, electronic money with a system capable of settlement via the Internet. As a result, for example if payment by electronic money is split into payment by a plurality of kinds of electronic money, even in the case where the remaining amount of electronic money is small, the payment can be made by applying the remaining amount.

Lastly, a hardware structure of a computer to which the above embodiments are preferably applied is described below.

Figure 24:
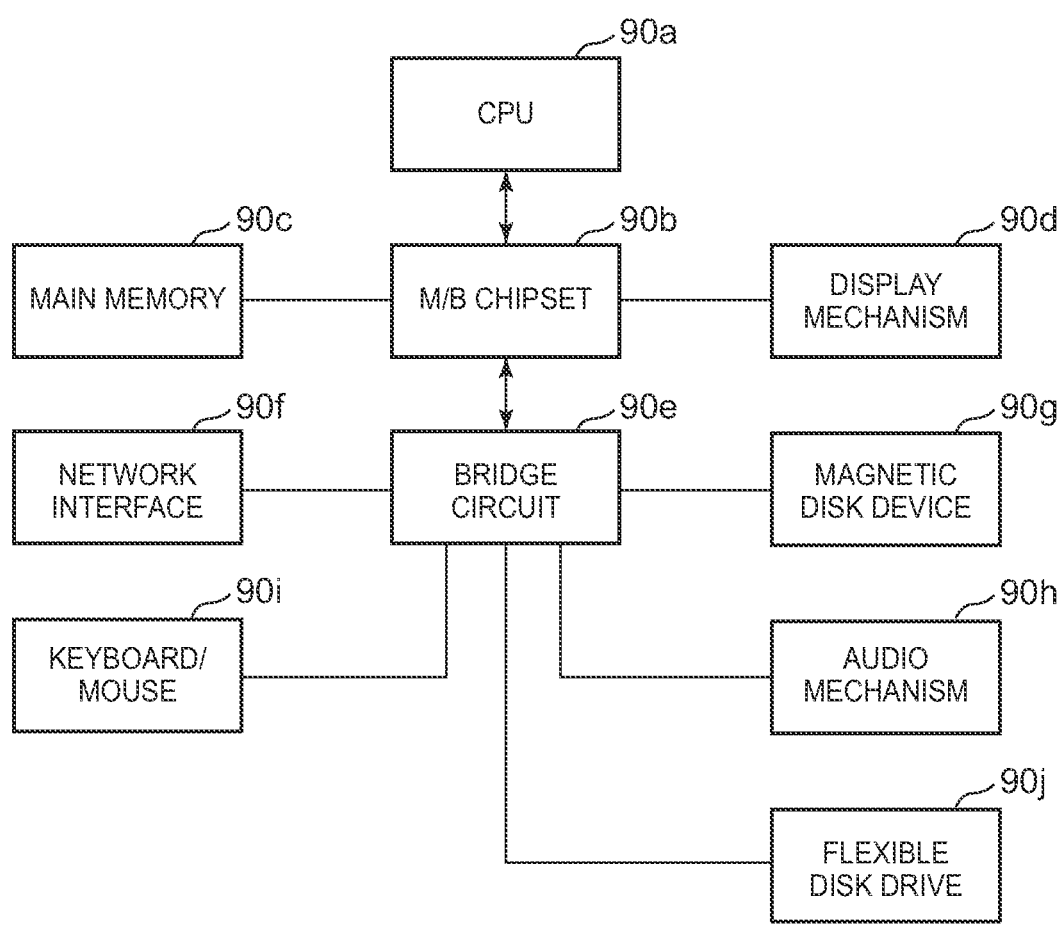
FIG. 24 is a diagram showing an example of a hardware structure of a computer to which the embodiments of the present invention are applicable.

FIG. 24 is a diagram showing an example of the hardware structure of the computer. As shown in the drawing, the computer includes the CPU (Central Processing Unit) 90a which is computing means, the main memory 90c connected to the CPU 90a via a M/B (motherboard) chipset 90b, and a display mechanism 90d equally connected to the CPU 90a via the M/B chipset 90b. A network interface 90f, the magnetic disk device (HDD) 90g, an audio mechanism 90h, a keyboard/mouse 90i, and a flexible disk drive 90j are connected to the M/B chipset 90b via a bridge circuit 90e.

In FIG. 24, the components are connected via a bus. For example, a CPU bus is used to connect the CPU 90a and the M/B chipset 90b, and connect the M/B chipset 90b and the main memory 90c. An AGP (Accelerated Graphics Port) may be used to connect the M/B chipset 90b and the display mechanism 90d. In the case where the display mechanism 90d includes a video card that supports PCI Express, however, a PCI Express (PCIe) bus is used to connect the M/B chipset 90b and the video card. For example, PCI Express may be used to connect the network interface 90f to the bridge circuit 90e. Serial ATA (AT Attachment), parallel transfer ATA, or PCI (Peripheral Components Interconnect)

may be used to connect the magnetic disk device 90*g* to the bridge circuit 90*e*. An USB (Universal Serial Bus) may be used to connect the keyboard/mouse 90*i* and the flexible disk drive 90*j* to the bridge circuit 90*e*.

The present invention may be realized by hardware alone, by software alone, or by both hardware and software. The present invention may be implemented as a computer, data processing system, or a computer program. The computer program may be stored in a computer readable medium and provided. The medium may be an electronic, magnetic, optical, electromagnetic, infrared, or semiconductor system (or apparatus or device) or a propagation medium. Examples of the computer readable medium include a semiconductor or solid state storage device, magnetic tape, a removable computer diskette, a random access memory (RAM), a read only memory (ROM), a rigid magnetic disk, and an optical disc. Current examples of the optical disc include a compact disc-read only memory (CD-ROM), a compact disc-read/write (CD-R/W), and a DVD.

While the present invention has been described by way of the embodiments, the technical scope of the present invention is not limited to the above embodiments. It will be understood by those of ordinary skill in the art that various changes and modifications may be made therein without departing from the spirit and scope of the present invention.

The invention claimed is:

1. A system for assisting in bill split payment, the system comprising:
   a processor; and
   a memory coupled to the processor, wherein the memory comprises instructions which, when executed by the processor, cause the processor to:
   receive, by a representative computer used by a representative of a group including a plurality of payers, total amount charge information from a payee computer used by a payee, wherein the total amount charge information includes a total payment amount to be paid to the payee, a charge code which uniquely identifies the charge, a signature data constructed from encrypting a digest value of the charge code and the total amount using a secret key of a payee, and a store certificate including a public key of the payee;
   transmit, by the representative computer, respective first amount information including a respective first payment amount decided by the representative for each of the plurality of payers to a plurality of payer computers used respectively by the plurality of payers, the charge code, the signature data, and the store certificate;
   receive, by the representative computer, respective second amount information transmitted from each of the plurality of payer computers, wherein the second amount information includes a respective second payment amount, the charge code, the signature data, and respective encrypted information generated by a settlement computer using the public key of the payee, wherein the respective encrypted information includes a respective accept code indicating acceptance of payment of the second payment amount by the settlement computer, wherein the encrypted information received from each of the plurality of payer computers cannot be decrypted by the representative computer without the secret key of the payee;
   determine that the representative computer has received the second amount information from all of the plurality of payer computers when a sum of the respective second payment amounts received from each of the plurality of payer computers matches the total payment amount;
   responsive to determining the representative computer has received the second amount information from all of the plurality of payer computers, concatenate, by the representative computer, the respective second amount information from the plurality of payer computers to form third amount information including a third payment amount that is calculated based on the respective second payment amount received from the plurality of payer computers; and
   transmit, by the representative computer, the third amount information to the payee computer, wherein the third amount information includes the respective encrypted information received from each of the plurality of payer computers.

2. The system according to claim 1,
   wherein the representative computer decides a split amount calculated by the representative splitting the total payment amount transmitted from the payee computer as the first payment amount,
   wherein each of the plurality of payer computers sets the split amount as the second payment amount, and
   wherein the representative computer sets the split amount as the third payment amount.

3. The system according to claim 1, wherein the representative computer determines an advance collected amount as the first payment amount,
   wherein each of the plurality of payer computers sets a payment upper limit amount decided by the payer who uses the payer computer according to the advance collected amount, as the second payment amount,
   wherein the payee computer transmits a total amount of a charge to the representative computer, after the representative computer receives the respective encrypted information and the respective second payment amount information from all of the plurality of payer computers, and
   wherein the representative computer determines a split amount calculated by the representative splitting the total payment amount transmitted from the payee computer so as not to exceed the payment upper limit amount, as the third payment amount.

4. The system of claim 1, wherein the total amount charge information includes available credit company information including a list of credit companies available for payment and wherein the first amount information includes the credit company information.

5. The system of claim 1, wherein the instructions further cause the processor to:
   sum, by the representative computer, the second payment amount received from the plurality of payer computers to form a sum, wherein the representative computer concatenates the second amount information from the plurality of payer computers responsive to determining the sum matches the total payment amount.

6. The system of claim 1, wherein the total amount charge information, the first amount information, the second amount information, and the third amount information are in extensible markup language format.

7. The system of claim 1, wherein the instructions further cause the processor to:
   receive, by the representative computer, a payment request corresponding to each payer computer, including the accept code, the charge code, and a charge amount; and transmit, by the representative computer, the payment request corresponding to each payer computer, including the accept code, the charge code, and a charge amount to the settlement computer.

8. A method for assisting in bill split payment by a representative computer used by a representative of a group including a plurality of payers, the method comprising:

receiving, by the representative computer, total amount charge information from a payee computer used by a payee, wherein the total amount charge information includes a total payment amount to be paid to the payee, a charge code which uniquely identifies the charge, a signature data constructed from encrypting a digest value of the charge code and the total amount using a secret key of a payee, and a store certificate including a public key of the payee;

transmitting, by the representative computer, respective first amount information including a respective first payment amount decided by the representative for each of the plurality of payers to a plurality of payer computers used respectively by the plurality of payers, the charge code, the signature data, and the store certificate;

receiving, by the representative computer, respective second amount information transmitted from each of the plurality of payer computers, wherein the second amount information includes respective second payment amount, the charge code, the signature data, and respective encrypted information generated by a settlement computer using the public key of the payee, wherein the respective encrypted information includes a respective accept code indicating acceptance of payment of the second payment amount by the settlement computer, wherein the encrypted information received from each of the plurality of payer computers cannot be decrypted by the representative computer without the secret key of the payee;

determining that the representative computer has received the second amount information from all of the plurality of payer computers when a sum of the respective second payment amounts received from each of the plurality of payer computers matches the total payment amount;

responsive to determining the representative computer has received the second amount information from all of the plurality of payer computers, concatenating, by the representative computer, the respective second amount information from the plurality of payer computers to form third amount information including a third payment amount that is calculated based on the respective second payment amount received from the plurality of payer computers; and transmitting, by the representative computer, the third amount information to the payee computer, wherein the third amount information includes the respective encrypted information received from each of the plurality of payer computers.

9. The method according to claim 8,
wherein the representative computer determines a split amount calculated by the representative splitting the total payment amount transmitted from the payee computer as the first payment amount,
wherein each of the plurality of payer computers sets the split amount as the second payment amount, and
wherein the representative computer sets the split amount as the third payment amount.

10. The method according to claim 8,
wherein the representative computer determines an advance collected amount as the first payment amount,
wherein each of the plurality of payer computers sets a payment upper limit amount decided by the payer who uses the payer computer according to the advance collected amount as the second payment amount, and
wherein the representative computer determines a split amount calculated by the representative splitting the total amount transmitted from the payee computer as the third payment amount.

11. The method of claim 8, wherein the total amount charge information includes available credit company information including a list of credit companies available for payment and wherein the first amount information includes the credit company information.

12. The method of claim 8, further comprising:
summing, by the representative computer, the second payment amount received from the plurality of payer computers to form a sum, wherein the representative computer concatenates the second amount information from the plurality of payer computers responsive to determining the sum matches the total payment amount.

13. The method of claim 8, wherein the total amount charge information, the first amount information, the second amount information, and the third amount information are in extensible markup language format.

14. The method of claim 8, further comprising:
receiving, by the representative computer, a payment request corresponding to each payer computer, including the accept code, the charge code, and a charge amount; and
transmitting, by the representative computer, the payment request corresponding to each payer computer, including the accept code, the charge code, and a charge amount to the settlement computer.

15. A computer program product comprising a computer readable storage medium having a computer readable program stored therein, wherein the computer readable program, when executed on a computing device, causes the computing device to:

receive, by a representative computer used by a representative of a group including a plurality of payers, total amount charge information from a payee computer used by a payee, wherein the total amount charge information includes a total payment amount to be paid to the payee, a charge code which uniquely identifies the charge, a signature data constructed from encrypting a digest value of the charge code and the total amount using a secret key of a payee, and a store certificate including a public key of the payee;

transmit, by the representative computer, respective first amount information including a respective first payment amount decided by the representative for each of the plurality of payers to a plurality of payer computers used respectively by the plurality of payers, the charge code, the signature data, and the store certificate;

receiving, by the representative computer, respective second amount information from each of the plurality of payer computers, wherein the second amount information includes a respective second payment amount, the charge code, the signature data, and respective encrypted information generated by a settlement computer using the public key of the payee, wherein the respective encrypted information includes a respective accept code indicating acceptance of payment of the second payment amount by the settlement computer, wherein the encrypted information received from each of the plurality of payer computers cannot be decrypted by the representative computer without the secret key of the payee;

determining that the representative computer has received the second amount information from all of the plurality of payer computers when a sum of the respective second payment amounts received from each of the plurality of payer computers matches the total payment amount;

responsive to determining the representative computer has received the second amount information from all of the plurality of payer computers, concatenating, by the representative computer, the respective second amount information from the plurality of payer computers to form third amount information including a third payment amount that is calculated based on the respective second payment amount received from the plurality of payer computers; and transmitting, by the representative computer, the third amount information to the payee computer, wherein the third amount information includes the respective encrypted information received from each of the plurality of payer computers.

16. The computer program product according to claim 15, wherein the representative computer decides a split amount calculated by the representative splitting the total payment amount transmitted from the payee computer as the first payment amount, wherein each of the plurality of payer computers sets the split amount as the second payment amount, and wherein the representative computer sets the split amount as the third payment amount.

17. The computer program product according to claim 15, wherein the representative computer determines an advance collected amount as the first payment amount, wherein each of the plurality of payer computers sets a payment upper limit amount decided by the payer who uses the payer computer according to the advance collected amount, as the second payment amount, wherein the payee computer transmits a total amount of a charge to the representative computer, after the representative computer receives the respective encrypted information and the respective second payment amount information from all of the plurality of payer computers, and wherein the representative computer determines a split amount calculated by the representative splitting the total payment amount transmitted from the payee computer so as not to exceed the payment upper limit amount, as the third payment amount.

18. The computer program product of claim 15, wherein the total amount charge information includes available credit company information including a list of credit companies available for payment and wherein the first amount information includes the credit company information.

19. The computer program product of claim 15, wherein the computer readable program further causes the computing device to:

sum, by the representative computer, the second payment amount received from the plurality of payer computers to form a sum, wherein the representative computer concatenates the second amount information from the plurality of payer computers responsive to determining the sum matches the total payment amount.

20. The computer program product of claim 15, wherein the computer readable program further causes the computing device to:

receive, by the representative computer, a payment request corresponding to each payer computer, including the accept code, the charge code, and a charge amount; and transmit, by the representative computer, the payment request corresponding to each payer computer, including the accept code, the charge code, and a charge amount to the settlement computer.

* * * * *